United States Patent
Tachiiwa et al.

(12)

(10) Patent No.: US 10,883,690 B2
(45) Date of Patent: Jan. 5, 2021

(54) VEHICLE LAMP

(71) Applicant: KOITO MANUFACTURING CO., LTD., Tokyo (JP)

(72) Inventors: Takeyuki Tachiiwa, Shizuoka (JP); Ryohei Takasu, Shizuoka (JP); Katsuhiko Okubo, Shizuoka (JP); Tatsuhiko Harada, Shizuoka (JP)

(73) Assignee: KOITO MANUFACTURING CO., LTD., Tokyo (JP)

( * ) Notice: Subject to any disclaimer, the term of this patent is extended or adjusted under 35 U.S.C. 154(b) by 0 days.

(21) Appl. No.: 16/492,008

(22) PCT Filed: Mar. 7, 2018

(86) PCT No.: PCT/JP2018/008755
§ 371 (c)(1),
(2) Date: Sep. 6, 2019

(87) PCT Pub. No.: WO2018/164179
PCT Pub. Date: Sep. 13, 2018

(65) Prior Publication Data
US 2020/0080700 A1   Mar. 12, 2020

(30) Foreign Application Priority Data

Mar. 8, 2017   (JP) .................................. 2017-044400
Mar. 27, 2017  (JP) .................................. 2017-060758
Jun. 13, 2017  (JP) .................................. 2017-116282

(51) Int. Cl.
*F21S 41/29*   (2018.01)
*F21S 41/143*  (2018.01)
(Continued)

(52) U.S. Cl.
CPC .......... *F21S 41/295* (2018.01); *F21S 41/143* (2018.01); *F21S 41/255* (2018.01); *B60Q 1/20* (2013.01);
(Continued)

(58) Field of Classification Search
CPC ...... F21S 41/295; F21S 41/255; F21S 41/143; F21S 41/635; F21S 45/47; B60Q 2300/05;
(Continued)

(56) References Cited

U.S. PATENT DOCUMENTS

| | | | | |
|---|---|---|---|---|
| 5,526,238 A | * | 6/1996 | Van Oel | B60Q 1/0683 362/421 |
| 5,779,343 A | * | 7/1998 | Denley | B60Q 1/0683 362/273 |

(Continued)

FOREIGN PATENT DOCUMENTS

| | | |
|---|---|---|
| DE | 19546271 A1 | 6/1997 |
| DE | 102005037074 A1 | 2/2007 |

(Continued)

OTHER PUBLICATIONS

International Search Report issued in PCT/JP2018/008755 dated Apr. 17, 2018 (5 pages).

(Continued)

*Primary Examiner* — Joseph L Williams
*Assistant Examiner* — Jose M Diaz
(74) *Attorney, Agent, or Firm* — Osha Bergman Watanabe & Burton LLP

(57) ABSTRACT

In a vehicle lamp, an optical axis adjustment screw for pivoting an optical member around a pivotal axis extending in a vehicle width direction is supported by a lamp body in a state of extending in a vertical direction on the rear side of the vehicle lamp with respect to pivotal axis. A protruding (Continued)

piece extending toward the rear of the vehicle lamp is formed in the optical member, and a groove portion to be screwed with a threaded portion of the optical axis adjustment screw is formed in the rear end surface of the protruding piece. The groove portion of the protruding piece and the threaded portion of the optical axis adjustment screw can be maintained in the screwed state.

9 Claims, 25 Drawing Sheets

(51) Int. Cl.
*F21S 41/255* (2018.01)
*F21W 102/30* (2018.01)
*F21S 45/47* (2018.01)
*B60Q 1/20* (2006.01)
(52) U.S. Cl.
CPC ........... *B60Q 2300/05* (2013.01); *F21S 45/47* (2018.01); *F21W 2102/30* (2018.01)
(58) Field of Classification Search
CPC .. B60Q 1/20; B60Q 2200/30; F21W 2102/30; F21V 17/02; F21V 17/00
See application file for complete search history.

(56) References Cited

U.S. PATENT DOCUMENTS

| | | | | |
|---|---|---|---|---|
| 6,796,679 B2* | 9/2004 | Smith, Jr. | ............ | B60Q 1/0041 |
| | | | | 362/239 |
| 7,150,541 B2* | 12/2006 | Burton | ................ | B60Q 1/0683 |
| | | | | 362/273 |
| 7,766,524 B2* | 8/2010 | Naganawa | ............ | F21S 41/147 |
| | | | | 362/544 |
| 8,075,171 B2* | 12/2011 | Yamamoto | ............. | B60Q 1/076 |
| | | | | 362/523 |
| 2002/0054496 A1* | 5/2002 | Fujino | ................... | B60Q 1/072 |
| | | | | 362/524 |
| 2005/0281038 A1* | 12/2005 | Burton | ................ | B60Q 1/0683 |
| | | | | 362/382 |
| 2008/0291690 A1* | 11/2008 | Gattone | ............... | B60Q 1/0683 |
| | | | | 362/524 |
| 2011/0286228 A1 | 11/2011 | Zanma | | |
| 2015/0184819 A1 | 7/2015 | Maliar et al. | | |
| 2015/0197179 A1 | 7/2015 | King et al. | | |
| 2016/0076757 A1 | 3/2016 | Seki | | |
| 2017/0370548 A1 | 12/2017 | Dinant et al. | | |

FOREIGN PATENT DOCUMENTS

| | | |
|---|---|---|
| DE | 60034506 T2 | 1/2008 |
| EP | 1739346 A1 | 1/2007 |
| EP | 1873445 A2 | 1/2008 |
| EP | 2623370 A2 | 8/2013 |
| EP | 3263979 A1 | 1/2018 |
| JP | S56-38304 U | 4/1981 |
| JP | 2011-243520 A | 12/2011 |
| JP | 2014-216103 A | 11/2014 |
| JP | 2015-522929 A | 8/2015 |

OTHER PUBLICATIONS

Written Opinion of the International Searching Authority issued in PCT/JP2018/008755 dated Apr. 17, 2018 (6 pages).
Extended European Search Report issued in corresponding European Application No. 18763723.6; dated Oct. 5, 2020 (10 pages).

* cited by examiner

VEHICLE LAMP

TECHNICAL FIELD

The disclosure relates to a vehicle lamp configured such that the distribution of light from a light source is controlled by an optical member.

BACKGROUND ART

Conventionally, there is known a vehicle lamp which is configured such that the distribution of light from a light source is controlled by an optical member such as a lens and the optical member can be pivoted with respect to a housing.

As such a vehicle lamp, "PTL 1" describes a vehicle lamp configured such that an optical member is pivoted around a pivotal axis extending in a first direction intersecting a front and rear direction of the lamp by an optical axis adjustment screw supported by a housing.

The optical member described in "PTL 1" has a pair of protruding pieces formed at an end portion in the first direction and extending toward the rear of the lamp and is screwed with the optical axis adjustment screw at groove portions formed on side surfaces of both protruding pieces facing each other.

CITATION LIST

Patent Literature

[PTL 1] JP-T-2015-522929

SUMMARY OF INVENTION

Technical Problem

When assembling the vehicle lamp described in PTL 1, it is necessary to screw the pair of protruding pieces with the optical axis adjustment screw at the groove portions. Therefore, there is room for improvement in order to increase the degree of freedom in assembling the lamp to improve the assembly workability.

The disclosure has been made in view of such circumstances and an object thereof is to provide a vehicle lamp which is configured such that the distribution of light from a slight source is controlled by an optical member and which is capable of improving the assembly workability even when the optical member is configured to be pivotable with respect to a housing.

Solution to Problem

The disclosure achieves the above object by devising the configurations of the optical member and the optical axis adjustment screw.

Specifically, a vehicle lamp according to an aspect of the disclosure is configured such that the distribution of light from a light source is controlled by an optical member, the vehicle lamp including a housing configured to support the optical member pivotably around a pivotal axis extending in a first direction intersecting a front and rear direction of the lamp; and an optical axis adjustment screw configured to pivot the optical member around the pivotal axis with respect to the housing, in which the optical axis adjustment screw is supported by the housing in a state of being arranged to extend in a second direction intersecting the first direction and the front and rear direction of the lamp on the rear side of the lamp with respect to the pivotal axis, in which a protruding piece extending toward the rear of the lamp is formed on the optical member, and in which a groove portion to be screwed with the optical axis adjustment screw is formed on a rear end surface of the protruding piece.

Further, the disclosure achieves the above object by devising the configuration of the optical member.

Specifically, a vehicle lamp according to an aspect of the disclosure is configured such that the distribution of light from a light source is controlled by an optical member, the vehicle lamp including a housing configured to support the optical member pivotably around a pivotal axis extending in a first direction intersecting a front and rear direction of the lamp; and an optical axis adjustment screw configured to pivot the optical member around the pivotal axis with respect to the housing, in which the optical axis adjustment screw is supported by the housing in a state of being arranged to extend in a second direction intersecting the first direction and the front and rear direction of the lamp, in which a protruding piece extending toward the rear of the lamp is formed at an end portion of the optical member in the first direction, in which a groove portion to be screwed with the optical axis adjustment screw is formed on an inner surface of a rear region of the protruding piece located on the rear side of the lamp with respect to the pivotal axis, and in which a detachment preventing portion is formed in the housing in a positional relationship in close proximity to or in contact with an outer surface of the rear region of the protruding piece so as to prevent the groove portion of the protruding piece from being disengaged from the screwed state with the optical axis adjustment screw.

Advantageous Effects of Invention

Since the optical member is configured to be screwed with the optical axis adjustment screw at the groove portion formed on the rear end surface, the screwed state between the groove portion of the protruding piece and the optical axis adjustment screw can be maintained.

Therefore, when assembling the lamp, it may be sufficient to screw the single protruding piece with the optical axis adjustment screw at the groove portion. In this way, the degree of freedom in assembling the lamp can be increased, so that the assembling workability of the vehicle lamp can be enhanced.

Thus, according to the disclosure, the assembly workability of the vehicle lamp configured such that the distribution of light from the slight source is controlled by the optical member can be improved even when the optical member is configured to be pivotable with respect to the housing.

Further, by unifying the protruding piece as in the disclosure, the weight reduction and space saving of the optical member can be achieved.

DESCRIPTION OF EMBODIMENTS

Hereinafter, embodiments of the disclosure will be described with reference to the drawings.

First Embodiment

Figure 1:
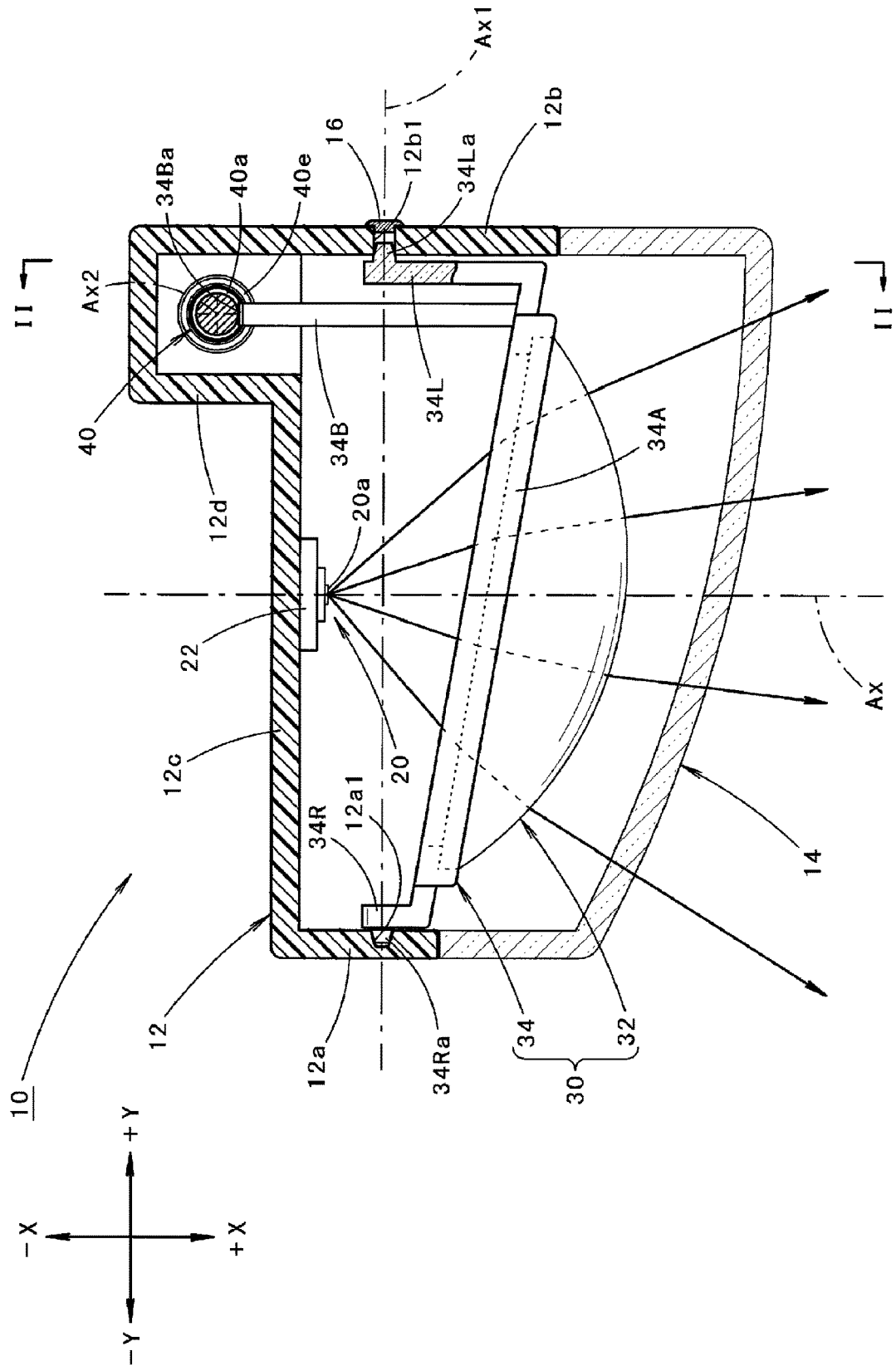
FIG. 1 is a sectional view showing a vehicle lamp according to a first embodiment of the disclosure.

FIG. 1 is a sectional view showing a vehicle lamp 10 according to an embodiment of the disclosure. Further, FIG. 2 is a sectional view taken along the line II-II in FIG. 1.

Figure 2:
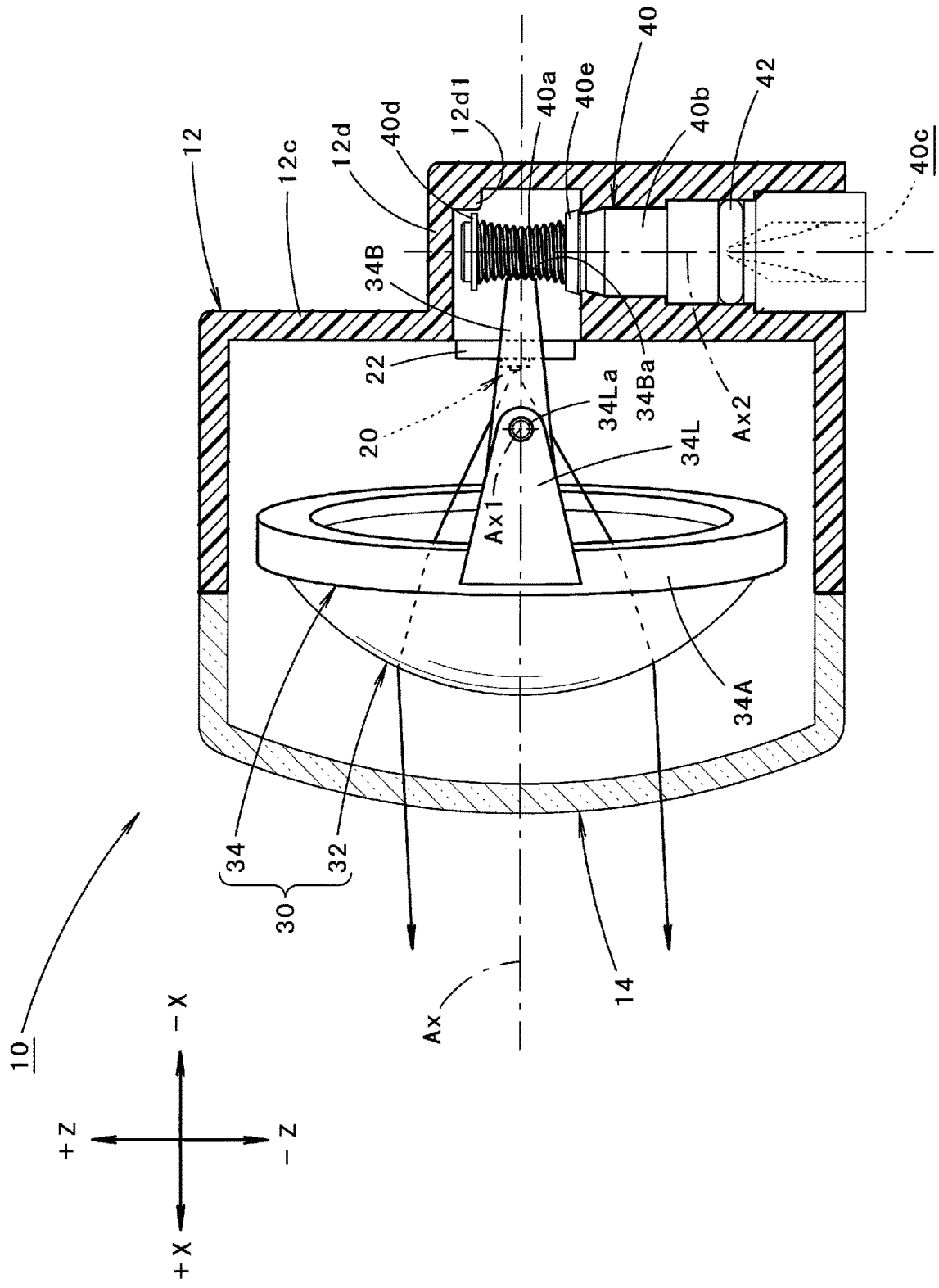
FIG. 2 is a sectional view taken along the line II-II in FIG. 1.

As shown in FIGS. 1 and 2, the vehicle lamp 10 is a fog lamp provided in a right front end portion of a vehicle. The vehicle lamp 10 is configured so that a light source 20 and an optical member 30 for controlling the distribution of light from the light source 20 are accommodated in a lamp chamber defined by a lamp body 12 as a housing and a plain transparent cover 14 attached to the front end opening thereof.

Meanwhile, in FIG. 1, the +X direction is the front of the vehicle lamp 10, and the +Y direction is the left direction orthogonal to the front of the vehicle lamp 10. The front and rear direction of the vehicle lamp 10 is the +X to −X direction in FIG. 1. The vertical direction of the vehicle lamp 10 is the direction orthogonal to the XY plane and is the +Z to −Z direction shown in FIG. 2.

The front (+X direction) of the vehicle lamp 10 in FIG. 1 is the front direction of the vehicle and the front direction of the vehicle lamp 10. The left direction (+Y direction) of the vehicle lamp 10 is the left direction of the vehicle. The +Y direction in FIG. 1 is the right direction of the vehicle in the front view of the vehicle lamp 10.

The +Y to −Y direction in FIG. 1 is the left and right direction of the vehicle lamp 10 and is the vehicle width direction of the vehicle.

The light source 20 is a white light emitting diode having a laterally long rectangular light emitting surface 20a extending in the vehicle width direction (i.e., the left and right direction). The light source 20 is supported on a rear surface wall 12c of the lamp body 12 via a substrate 22 having a heat sink function with its light emitting surface 20a facing the front direction of the lamp (i.e., the front of the vehicle).

The optical member 30 includes a lens 32 for controlling the deflection of light emitted from the light source 20 and a lens holder 34 for supporting the lens 32. The lens 32 and the lens holder 34 are members made of transparent resin and are integrated by welding, fitting or the like.

The lens 32 is disposed on the front side (+X side) of the light source 20. An optical axis Ax of the lens 32 extends in the front and rear direction of the lamp near the lower side of the light emitting surface 20a (FIG. 2). The lens 32 has a front surface formed in a convex shape and a rear surface formed in a planar shape. The lens 32 is disposed in a state of being inclined toward the rear of the lamp from the left end portion to the right end portion of the lens 32 in the XY plane of FIG. 1. Further, the lens 32 is configured to emit light toward the front of the lamp as slightly downward light spreading widely in the vehicle width direction as indicated by the arrows in FIG. 2, thereby forming a light distribution pattern for a fog lamp on the front of the vehicle.

The lens holder 34 is configured as a ring-shaped member for supporting an outer peripheral edge of the lens 32. The lens holder 34 has a body part 34A formed to be inclined toward the rear of the lamp from the left end portion to the right end portion along the rear surface of the lens 32, and a pair of leg parts 34L, 34R formed on both left and right sides of the body part 34A.

Further, the optical member 30 is supported at the pair of left and right leg parts 34L, 34R to be pivotable around a pivotal axis Ax1 extending in the vehicle width direction (i.e., the horizontal direction orthogonal to the optical axis Ax) with respect to the lamp body 12. The vehicle width direction is a direction intersecting the front and rear direction of the vehicle lamp 10 and is an example of the first direction.

The specific configuration for realizing this is as follows.

Specifically, the pair of left and right leg parts 34L, 34R are formed to protrude to both sides in the left and right direction from both left and right sides of the body part 34A of the lens holder 34 in a plan view, and then, to extend in a plate shape toward the rear of the lamp. Fulcrum protrusions 34La, 34Ra protruding outward on the pivotal axis Ax1 are formed on the outer surfaces (i.e., the side surface opposite to the optical axis Ax) of the rear end portions of the leg parts 34L, 34R, respectively.

The pair of left and right leg parts 34L, 34R are both formed to extend in a tongue shape from the body part 34A of the lens holder 34 toward the rear of the lamp in a side view, as shown in FIG. 2. As shown in FIG. 1, as the body part 34A of the lens holder 34 is inclined toward the rear of the lamp from the left end portion to the right end portion, the left leg part 34L is formed longer than the right leg part 34R. Further, the pair of left and right fulcrum protrusions 34La, 34Ra are both formed in a truncated cone shape and their base end portions are formed in a cylindrical shape. The base end portions of the fulcrum protrusions 34La, 34Ra are configured so that the length of the left fulcrum protrusion 34La in the +Y to −Y direction is longer than the length of the right fulcrum protrusion 34Ra in the +Y to −Y direction.

Further, the optical member 30 is configured so that the fulcrum protrusion 34Ra of the right leg part 34R of the lens holder 34 is inserted into a recessed portion 12a1 formed on the inner surface of a right wall 12a of the lamp body 12 and the fulcrum protrusion 34La of the left leg part 34L of the lens holder 34 is inserted into a through-hole 12b1 formed in a left wall 12b of the lamp body 12. By being attached in this way, the optical member 30 is supported to be pivotable around the pivotal axis Ax1 with respect to the lamp body 12. Meanwhile, a plug member 16 for plugging the through-hole 12b1 is mounted to the left wall 12b of the lamp body 12 from the outer surface side of the left wall 12b.

Figure 3:
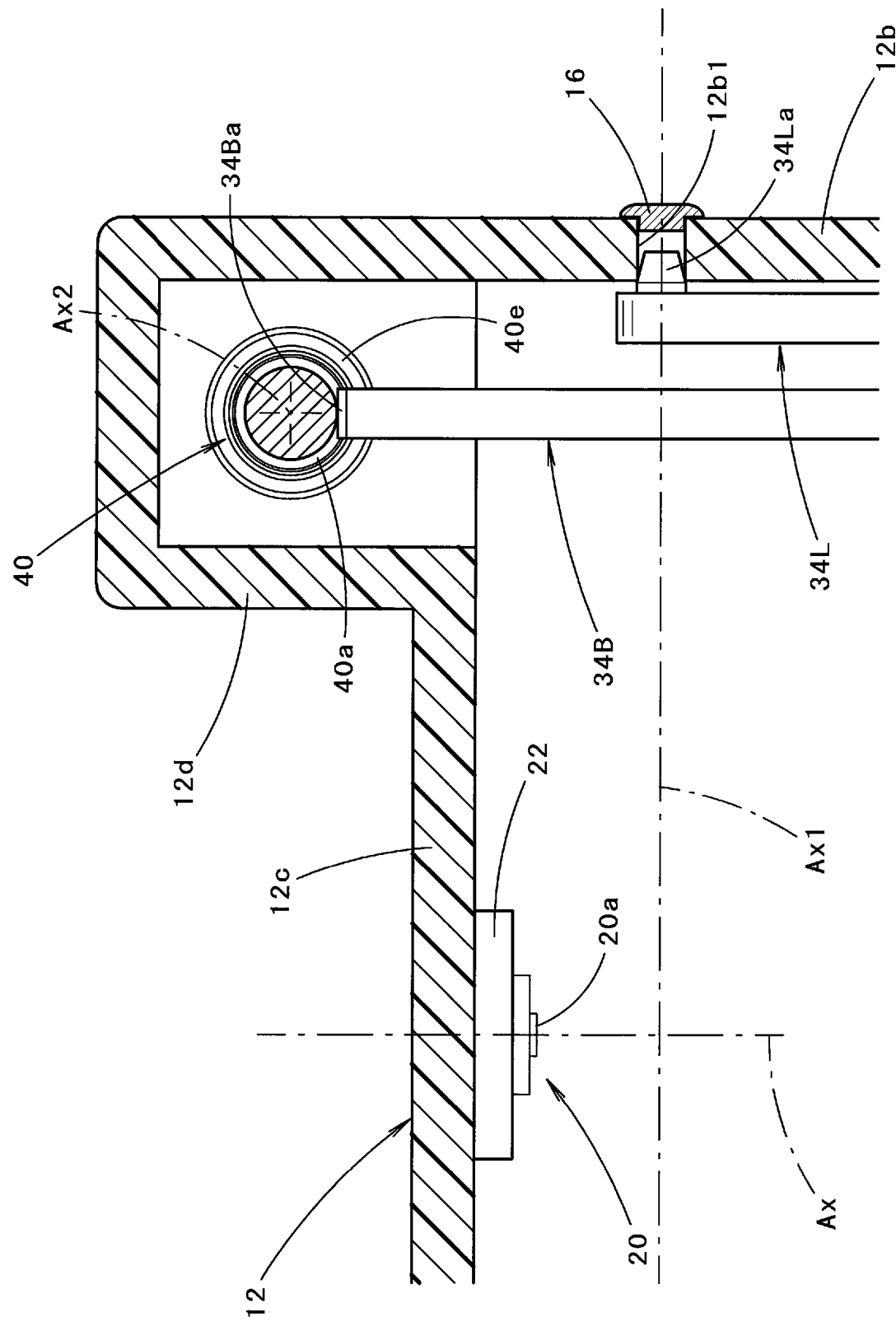
FIG. 3 is a partial enlarged view of FIG. 1.
Figure 4:
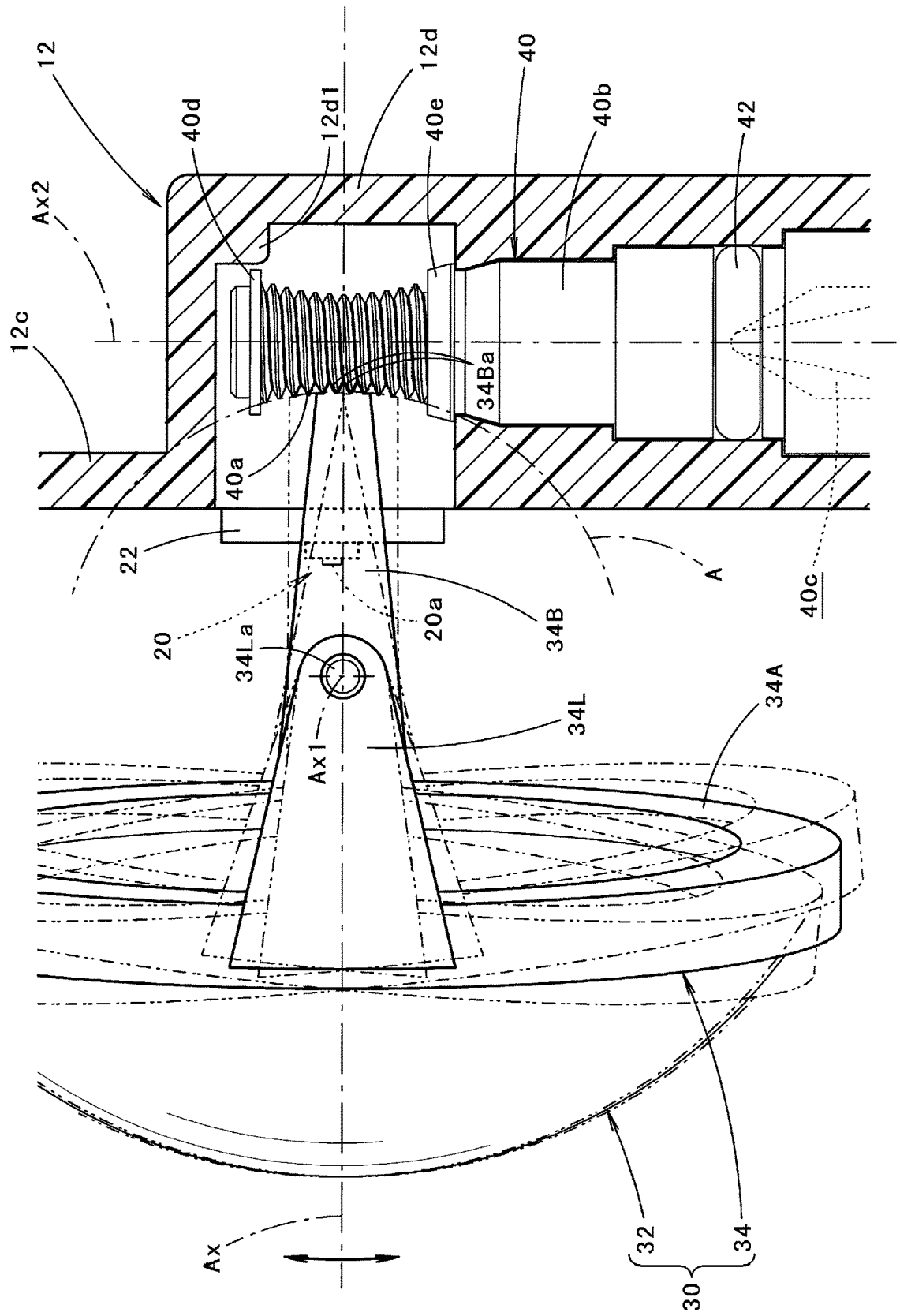
FIG. 4 is a partial enlarged view of FIG. 2.

FIG. 3 is a partial enlarged view of FIG. 1, and FIG. 4 is a partial enlarged view of FIG. 2.

As also shown in FIGS. 3 and 4, the left rear end portion of the lamp body 12 is configured as an overhang portion 12d overhanging from the rear surface wall 12c toward the rear of the lamp. An optical axis adjustment screw 40 for pivoting the optical member 30 around the pivotal axis Ax1 is supported on the lower wall of the overhang portion 12d so as to be rotatable around an axis Ax2 extending in the vertical direction. The optical axis adjustment screw 40 is disposed to extend in the vertical direction (an example of the second direction) on the rear side of the vehicle lamp 10 relative to the pivotal axis Ax1. The second direction is a direction intersecting the first direction and the front and rear direction of the vehicle lamp 10.

The optical axis adjustment screw 40 is a member made of resin. As shown in FIGS. 2 and 4, the optical axis adjustment screw 40 is formed so that its diameter gradually decreases from the lower end portion to the upper end portion. A threaded portion 40a is formed at the upper end portion of the optical axis adjustment screw 40. The threaded portion 40a is an hourglass worm. The hourglass worm is formed so that the diameter of the portion at the same height position as the position of the optical axis Ax shown in FIG. 4 in the +Z to −Z direction is the smallest and the diameter gradually increases toward both upper and lower end edges. The threaded portion 40a is formed so that its diameter increases along an arc A (see FIG. 4) centered on the pivotal axis Ax1.

Further, the optical axis adjustment screw 40 is supported on the lamp body 12 at a shaft portion 40b located in the middle of the optical axis adjustment screw 40 in the vertical direction in a state where the threaded portion 40a is exposed to the inside of the lamp chamber and the lower end portion of the optical axis adjustment screw 40 is exposed to the space outside the lamp chamber.

A driver insertion hole 40c is formed at the lower end portion of the optical axis adjustment screw 40. The optical axis adjustment screw 40 can be rotated around the axis Ax2 by inserting and operating a driver (not shown) into the driver insertion hole 40c. An O-ring 42 for securing the airtightness of the lamp chamber is mounted to the shaft portion 40b of the optical axis adjustment screw 40.

A protruding piece 34B extending toward the rear of the vehicle lamp 10 is formed on the left portion of the lens holder 34, as shown in FIGS. 1 and 3.

The protruding piece 34B is formed in a plate shape extending along a vertical plane parallel to the optical axis Ax near the right side of the left leg part 34L. The protruding piece 34B is formed in a shape that is gradually tapered toward the rear of the vehicle lamp 10 with the same height position as the position of the optical axis Ax in the +Z to −Z direction as the center in a side view, as shown in FIGS. 2 and 4. By unifying the protruding piece 34B in this manner, the weight reduction and space saving of the optical member 30 can be achieved.

A rear end surface of the protruding piece 34B is located on the rear side of the lamp (near the front of the axis Ax2) relative to the pivotal axis Ax1. A plurality of (specifically, two) groove portions 34Ba to be screwed with the optical axis adjustment screw 40 is formed on the rear end surface. The plurality of groove portions 34Ba are located between a plurality of (specifically, three) ridges formed on the rear end surface of the protruding piece 34B. The portions of the rear end surface located on both sides of the plurality of ridges in the upper and lower direction are formed in a vertical plane shape at substantially the same positions as the bottom portions of the groove portions 34Ba.

When the optical member 30 is in the pivot reference position which is the reference position for adjusting the optical axis, the plurality of groove portions 34Ba are screwed with the threaded portion 40a of the optical axis adjustment screw 40 with the same height position as the optical axis Ax as the center.

Figure 5:
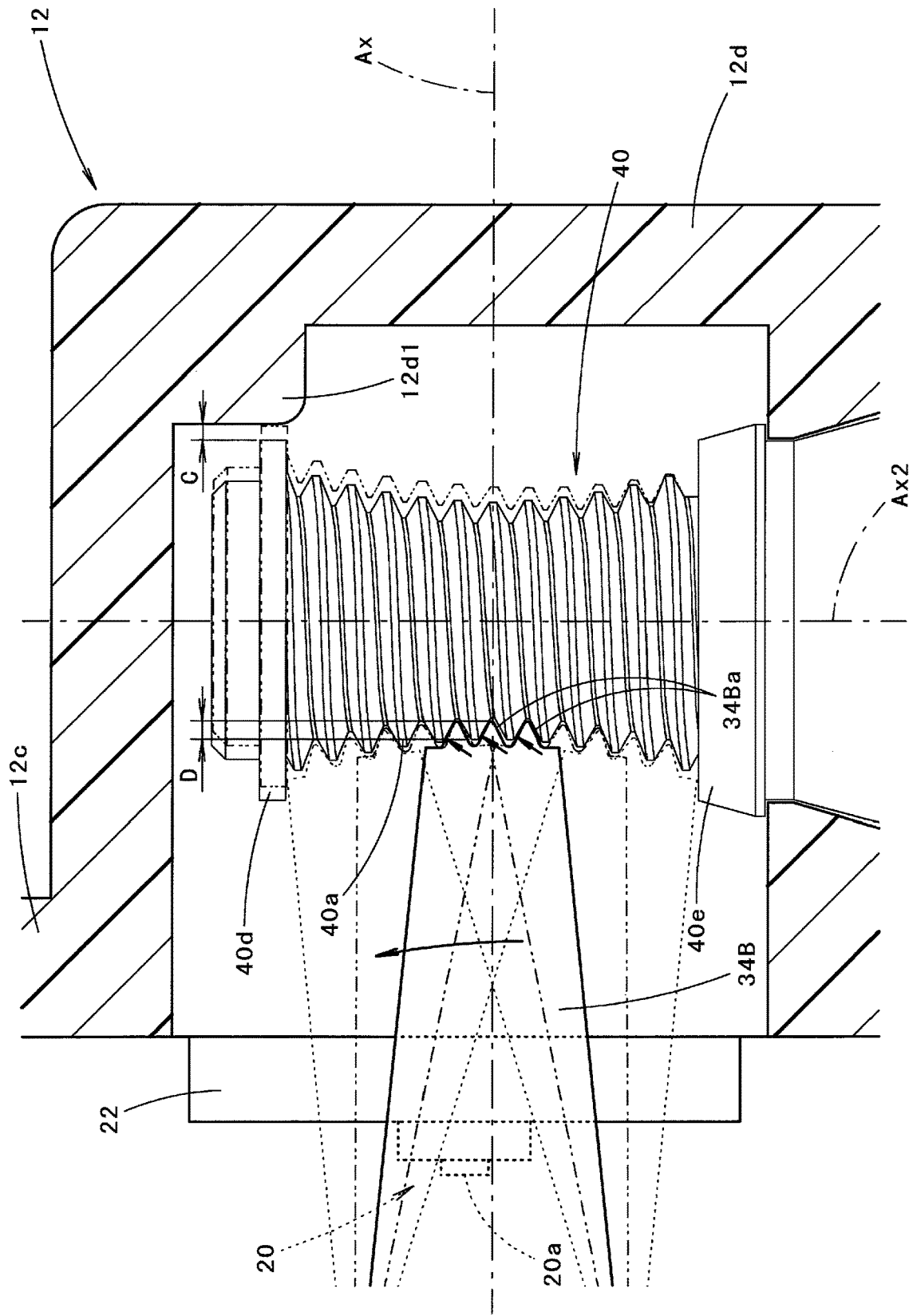
FIG. 5 is a partial enlarged view of FIG. 4.

FIG. 5 is a partial enlarged view of FIG. 4.

As also shown in FIG. 5, each groove portion 34Ba has a substantially wedge-like vertical section and is formed to extend linearly in the vehicle width direction. The vertical width (plate thickness) of each groove portion 34Ba is set to the same value (the same width) as the pitch of the threaded portion 40a of the optical axis adjustment screw 40.

On the upper and lower sides of the threaded portion 40a of the optical axis adjustment screw 40, excessive-rotation restricting portions 40d, 40e whose diameters are larger than the diameters of the upper and lower end edges of the threaded portion 40a are formed. The upper excessive-rotation restricting portion 40d is formed in a disk shape in the XY plane. The lower excessive-rotation restricting portion 40e is formed in a truncated cone shape in the XY plane.

When the optical member 30 is pivoted from the pivot reference position by a predetermined angle or more beyond the normal optical axis adjustment angle range, the excessive-rotation restricting portions 40d, 40e come into contact with the upper end edge or lower end edge of the rear end portion of the protruding piece 34B to restrict further rotation of the optical member 30. For example, as shown in FIG. 5, when the optical member 30 is pivoted beyond the angle range (e.g., a range of about ±4°) indicated by a two-dot chain line and pivoted more than the angle range (e.g., a range of about ±11°) indicated by a broken line, the excessive-rotation restricting portions 40d, 40e are brought into contact with the upper end edge or lower end edge of the rear end portion of the protruding piece 34B, and further rotation of the optical member 30 is restricted.

On the upper portion of the inner surface of the rear wall in the overhang portion 12d of the lamp body 12, a detachment preventing portion 12d1 is formed to prevent that the groove portions 34Ba of the protruding piece 34B are disengaged from the screwed state with the threaded portion 40a of the optical axis adjustment screw 40 due to the bending deformation of the optical axis adjustment screw 40. The detachment preventing portion 12*d*1 is formed to protrude from the overhang portion 12*d* toward the interior of the lamp chamber in a positional relationship in close proximity to the outer peripheral surface of the upper excessive-rotation restricting portion 40*d*.

Specifically, when the dimension of the gap between the detachment preventing portion 12*d*1 and the outer peripheral surface of the excessive-rotation restricting portion 40*d* is defined as C, and the dimension of the effective teeth depth in the screwed state between the groove portions 34Ba of the protruding piece 34B and the threaded portion 40*a* of the optical axis adjustment screw 40 is defined as D, the detachment preventing portion 12*d*1 is formed such that the dimension C has a value smaller than the dimension D. The dimension C is, for example, a value of approximately C=0.2 to 0.6×D.

The function of the detachment preventing portion 12*d*1 will be described as follows.

Specifically, since the relatively heavy lens 32 is located on the front side (+X direction side) relative to the pivotal axis Ax1, a rotational moment for rotating the protruding piece 34B in a direction to push it upward is generated on the optical member 30 (the rotational moment is indicated by an arrow in FIG. 4). Therefore, the threaded portion 40*a* of the optical axis adjustment screw 40 in the screwed state with the groove portions 34Ba of the protruding piece 34B comes into contact with the groove portions 34Ba of the protruding piece 34B at its downward inclined surface and is subjected to an upward pressing force (the pressing force is indicated by an arrow in FIG. 5).

In this manner, the upper end portion of the optical axis adjustment screw 40 tries to bend to the rear side of the vehicle lamp 10 as indicated by a two-dot chain line in FIG. 5. However, when the optical axis adjustment screw 40 is bent and deformed to a certain extent, the upper excessive-rotation restricting portion 40*d* comes into contact with the detachment preventing portion 12*d*1, and further bending deformation of the optical axis adjustment screw 40 is restricted. As a result, it is prevented in advance that the groove portions 34Ba of the protruding piece 34B are disengaged from the screwed state with the threaded portion 40*a*.

Next, operational effects of the present embodiment will be described.

The vehicle lamp 10 according to the present embodiment includes the optical axis adjustment screw 40 for pivoting the optical member 30 with respect to the lamp body 12 (the housing) around the pivotal axis Ax1 extending in the vehicle width direction (the first direction intersecting the front and rear direction of the lamp). The optical axis adjustment screw 40 is supported on the lamp body 12 in a state of being disposed to extend in the vertical direction (the second direction intersecting the first direction and the front and rear direction of the lamp) on the rear side of the vehicle lamp 10 relative to the pivotal axis Ax1. The protruding piece 34B extending toward the rear of the vehicle lamp 10 is formed on the optical member 30 of the vehicle lamp 10. The groove portions 34Ba for screwing with the threaded portion 40*a* of the optical axis adjustment screw 40 are formed on the rear end surface of the protruding piece 34B. The vehicle lamp 10 configured in this manner can obtain the following operational effects.

Specifically, the optical member 30 is configured to be screwed with the threaded portion 40*a* of the optical axis adjustment screw 40 at the groove portions 34Ba formed on the rear end surface of the protruding piece 34B, instead of the side surface. In this way, the screwed state between the groove portions 34Ba of the protruding piece 34B and the threaded portion 40*a* of the optical axis adjustment screw 40 can be maintained. Therefore, the optical member 30 may be configured not to include a pair of protruding pieces, unlike the prior art.

Therefore, when assembling the vehicle lamp 10, it may be sufficient to screw the single protruding piece 34B with the optical axis adjustment screw 40 at the groove portions 34Ba. In this way, the degree of freedom in assembling the vehicle lamp 10 can be increased, so that the assembling workability of the vehicle lamp 10 can be enhanced.

In this way, according to the present embodiment, in the vehicle lamp 10 configured to control the distribution of light from the light source 20 by the optical member 30, the assembling workability of the vehicle lamp 10 can be enhanced even when the optical member 30 is configured to be pivotable with respect to the lamp body 12.

Further, by unifying the protruding piece 34B as in the present embodiment, the weight reduction and space saving of the optical member 30 can be achieved.

Furthermore, in the present embodiment, the threaded portion 40*a* of the optical axis adjustment screw 40 screwed with the groove portions 34Ba of the protruding piece 34B is configured by an hourglass worm, so that the screwed state between the protruding piece 34B and the optical axis adjustment screw 40 can be easily maintained. In this way, it can be effectively suppressed that the groove portions 34Ba of the protruding piece 34B are disengaged from the screwed state with the threaded portion 40*a* of the optical axis adjustment screw 40 due to vibration or the like of a vehicle.

Further, in the present embodiment, the excessive-rotation restricting portions 40*d*, 40*e* are formed on the optical axis adjustment screw 40 such that they come into contact with the rear end portion of the protruding piece 34B to restrict excessive rotation when the optical member 30 is pivoted by a predetermined angle or more from the pivot reference position. Therefore, it can be prevented in advance that the groove portions 34Ba of the protruding piece 34B are disengaged from the screwed state with the threaded portion 40*a* of the optical axis adjustment screw 40 due to the optical axis adjustment more than necessary.

Furthermore, in the present embodiment, the detachment preventing portion 12*d*1 is formed on the overhang portion 12*d* of the lamp body 12 in a positional relationship in close proximity to the optical axis adjustment screw 40 so as to prevent that the groove portions 34Ba of the protruding piece 34B are disengaged from the screwed state with the threaded portion 40*a* of the optical axis adjustment screw 40 due to the bending deformation of the optical axis adjustment screw 40. Therefore, the screwed state between the groove portions 34Ba of the protruding piece 34B and the threaded portion 40*a* of the optical axis adjustment screw 40 can be made more reliable. In this way, it can be more effectively suppressed that the groove portions 34Ba of the protruding piece 34B are disengaged from the screwed state with the threaded portion 40*a* of the optical axis adjustment screw 40 due to vibration or the like of a vehicle.

In the above embodiment, two groove portions 34Ba are formed on the rear end surface of the protruding piece 34B. However, one or three or more groove portions 34Ba may be formed.

In the above embodiment, the detachment preventing portion 12*d*1 formed on the overhang portion 12*d* of the lamp body 12 is disposed in a positional relationship in close proximity to the outer peripheral surface of the excessive-rotation restricting portion 40d for the protruding piece 34B. However, the disclosure is not limited to this configuration. The detachment preventing portion 12d1 may be disposed in a positional relationship in contact with the outer peripheral surface of the excessive-rotation restricting portion 40d for the protruding piece 34B.

In the above embodiment, the light source 20 is supported on the rear surface wall 12c of the lamp body 12 via the substrate 22. However, the disclosure is not limited to this configuration. The light source 20 may be supported on a socket via the substrate 22, and the socket may be detachably mounted to the rear surface wall 12c of the lamp body 12.

In the above embodiment, the housing supporting the optical member 30 is configured as the lamp body 12. However, other lamp components (for example, a frame member supported on the lamp body 12, etc.) may be employed.

First Modification of First Embodiment

Next, modifications of the first embodiment will be described.

First, a first modification of the first embodiment will be described.

Figure 6:
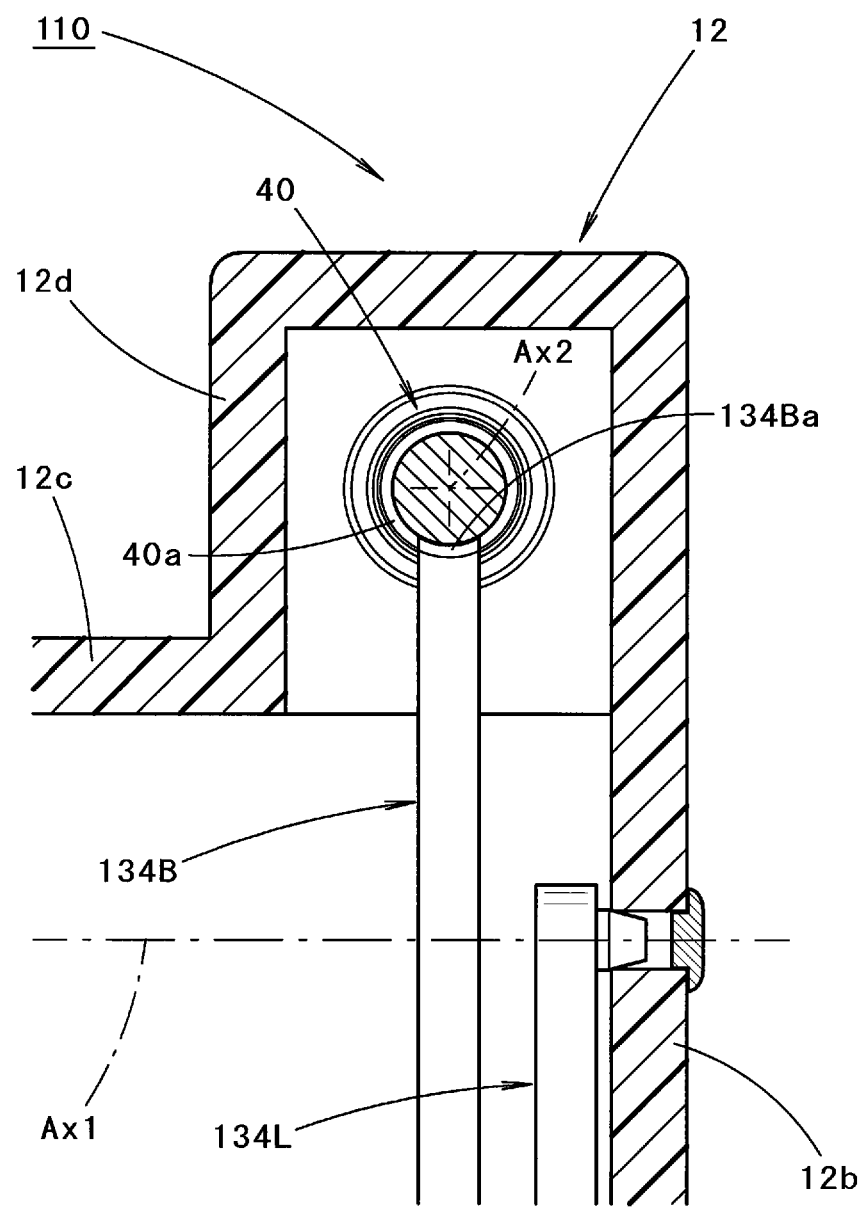
FIG. 6 is a view similar to FIG. 3, showing a first modification.

FIG. 6 is a view similar to FIG. 3, showing a partial enlarged view of a vehicle lamp 110 according to the present modification.

As shown in FIG. 6, the basic configuration of the present modification is the same as that of the above embodiment, but the configuration of a protruding piece 134B of the optical member is partially different from that of the protruding piece 34B in the above embodiment.

Specifically, similar to the protruding piece 34B of the above embodiment, the protruding piece 134B of the present modification is also formed to extend in a plate shape along a vertical plane parallel to the optical axis Ax (see FIG. 3) near the right side of a left leg part 134L. A plurality of groove portions 134Ba to be screwed with the threaded portion 40a of the optical axis adjustment screw 40 is formed on the rear end surface of the protruding piece 134B.

On the other hand, in the protruding piece 134B of the present modification, each groove portion 134Ba is formed not to extend linearly in the vehicle width direction but to extend along an arc centered on the axis Ax2 of the optical axis adjustment screw 40. In other words, the groove portions 134Ba are different from those of the protruding piece 34B in that the groove portions 134Ba are formed to extend along an arc centered on an axis extending in the second direction.

When the configuration of the present modification is adopted, the screwing range between the groove portions 134Ba of the protruding piece 134B and the threaded portion 40a of the optical axis adjustment screw 40 can be expanded. In this way, the screwed state between the groove portions 134Ba of the protruding piece 134B and the threaded portion 40a of the optical axis adjustment screw 40 can be made more reliable. Further, it can be more effectively suppressed that the groove portions 134Ba of the protruding piece 134B are disengaged from the screwed state with the threaded portion 40a of the optical axis adjustment screw 40 due to vibration or the like of a vehicle.

Second Modification of First Embodiment

Next, a second modification of the first embodiment will be described.

Figure 7:
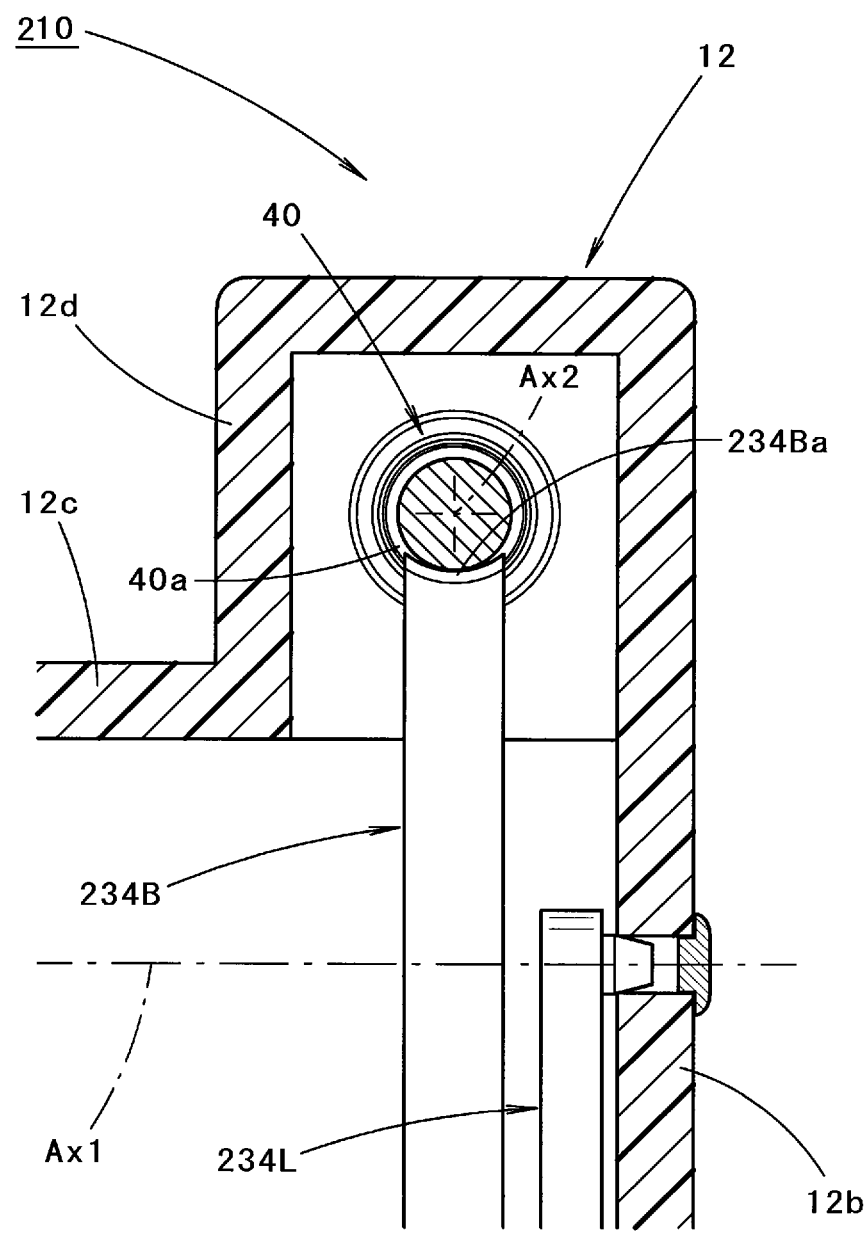
FIG. 7 is a view similar to FIG. 3, showing a partial enlarged view of a second modification.

FIG. 7 is a view similar to FIG. 3, showing a partial enlarged view of a vehicle lamp 210 according to the present modification.

As shown in FIG. 7, the basic configuration of the present modification is the same as that of the above embodiment, but the configuration of a protruding piece 234B of the optical member is partially different from that of the protruding piece 34B of the above embodiment.

Specifically, similar to the protruding piece 34B of the above embodiment, the protruding piece 234B of the present modification is also formed to extend in a plate shape along a vertical plane parallel to the optical axis Ax (see FIG. 3) near the right side of a left leg part 234L. A plurality of groove portions 234Ba to be screwed with the threaded portion 40a of the optical axis adjustment screw 40 is formed on the rear end surface of the protruding piece 234B.

On the other hand, the protruding piece 234B of the present modification is different from the protruding piece 34B in that each groove portion 234Ba is formed not to extend linearly in the vehicle width direction but to extend along an arc whose radius of curvature is larger than that of an arc centered on the axis Ax2 of the optical axis adjustment screw 40, and the plate thickness dimension of the protruding piece 234B is set to a value larger than that of the protruding piece 34B in the above embodiment.

Also when the configuration of the present modification is adopted, the screwing range between the groove portions 234Ba of the protruding piece 234B and the threaded portion 40a of the optical axis adjustment screw 40 can be expanded. In this way, the screwed state between the groove portions 234Ba of the protruding piece 234B and the threaded portion 40a of the optical axis adjustment screw 40 can be made more reliable.

Further, it can be more effectively suppressed that the groove portions 234Ba of the protruding piece 234B are disengaged from the screwed state with the threaded portion 40a of the optical axis adjustment screw 40 due to vibration or the like of a vehicle.

Third Modification of First Embodiment

Next, a third modification of the first embodiment will be described.

Figure 8:
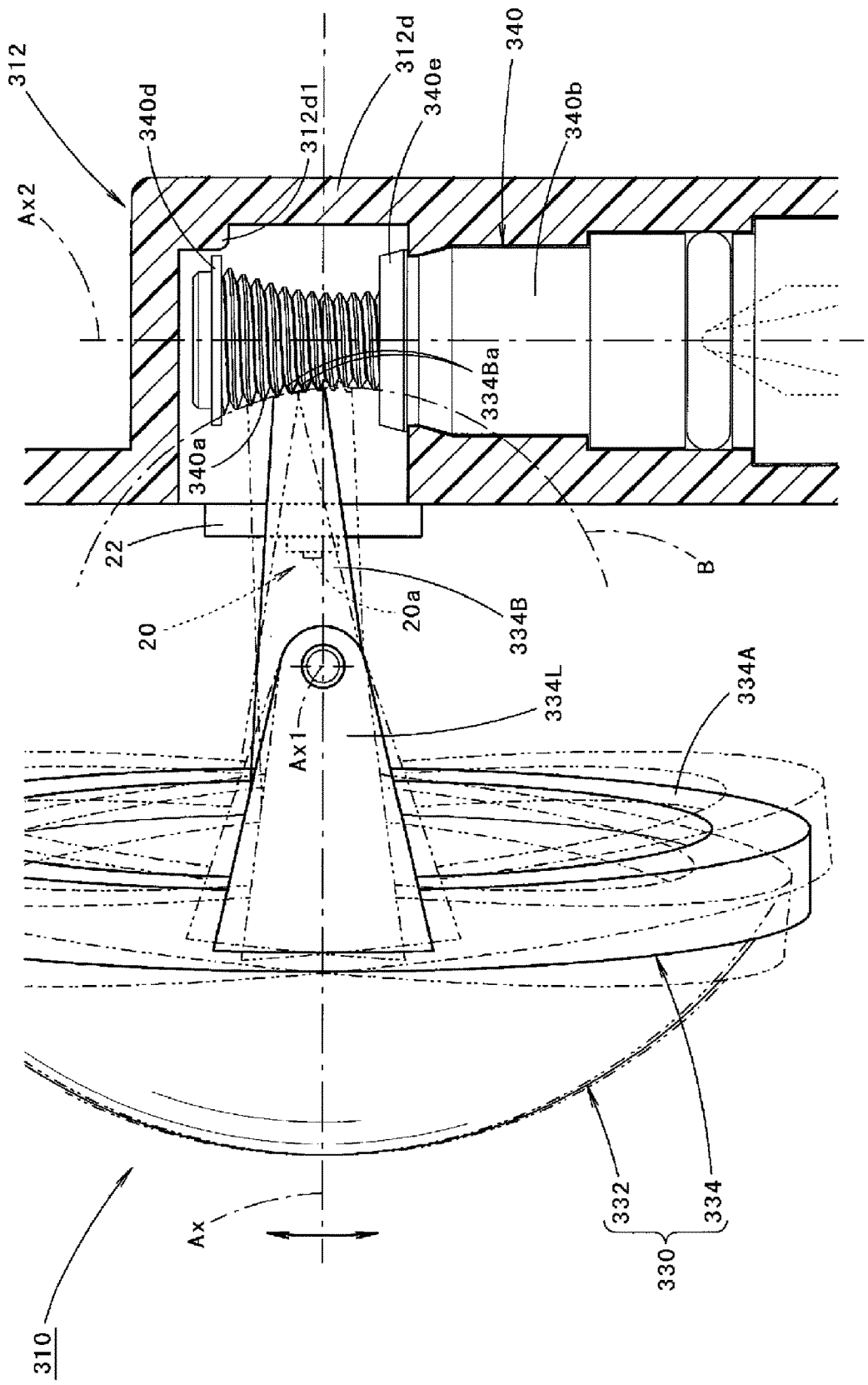
FIG. 8 is a view similar to FIG. 4, showing a partial enlarged view of a third modification.

FIG. 8 is a view similar to FIG. 4, showing a partial enlarged view of a vehicle lamp 310 according to the present modification.

As shown in FIG. 8, the basic configuration of the present modification is the same as that of the above embodiment, but the configuration of an optical axis adjustment screw 340 is partially different from that of the optical axis adjustment screw 40 in the above embodiment. Accordingly, configurations of an optical member 330 and a lamp body 312 are also partially different from those in the above embodiment.

Specifically, similar to the optical axis adjustment screw 40 of the above embodiment, the optical axis adjustment screw 340 of the present modification is also formed so that its diameter gradually decreases from a lower end portion to an upper end portion. A threaded portion 340a is formed on the upper end portion of the optical axis adjustment screw 340.

On the other hand, the optical axis adjustment screw 340 of the present modification is different from the optical axis adjustment screw 40 in that the threaded portion 340a is configured by a substantially upper half of an hourglass worm. That is, the threaded portion 340a is configured such that, with reference to the most narrowed portion (i.e., the portion having the smallest diameter) of the hourglass worm, the distance from the most narrowed portion to an upper end edge of the hourglass is longer than the distance from the most narrowed portion to a lower end edge of the hourglass worm.

In addition, the optical axis adjustment screw 340 is disposed in such a state that the threaded portion 340a is the smallest in diameter at the position of the optical axis Ax and gradually increases in diameter toward the upper end edge. That is, the threaded portion 340a is formed such that its diameter increases along an arc B centered on the pivotal axis Ax1.

Further, the optical axis adjustment screw 340 is the same as the optical axis adjustment screw 40 of the above embodiment in that it is supported by the lamp body 312 at a shaft portion 340b located in the middle in a state where the threaded portion 340a is exposed to the inside of the lamp chamber and the lower end portion of the optical axis adjustment screw 340 is exposed to the space outside the lamp chamber. However, the optical axis adjustment screw 340 is different from the optical axis adjustment screw 40 in that the shaft portion 340b is formed to have a diameter larger than that of the shaft portion 40b in the above embodiment.

Also in the optical member 330 of the present modification, the configurations of a lens 332 and a body part 334A and leg parts 334L of a lens holder 334 are the same as those in the above embodiment, but the configuration of a protruding piece 334B is different from that of the protruding piece 34B in the above embodiment.

Specifically, similar to the protruding piece 34B of the above embodiment, the protruding piece 334B of the present modification is formed to extend in a plate shape along a vertical plane parallel to the optical axis Ax near the right side of the left leg part 334L. On the rear end surface of the protruding piece 334B, a plurality of (specifically, two) groove portions 334Ba to be screwed with the threaded portion 340a of the optical axis adjustment screw 340 is formed to extend in the vehicle width direction.

On the other hand, the protruding piece 334B of the present modification is different from the protruding piece 34B of the above embodiment in that the plurality of groove portions 334Ba is configured to be screwed with the threaded portion 340a at a substantially central position (i.e., the position above the optical axis Ax) of the formation region of the threaded portion 340a of the optical axis adjustment screw 340 in the upper and lower direction when the optical member 330 is in the pivot reference position.

Figure 9:
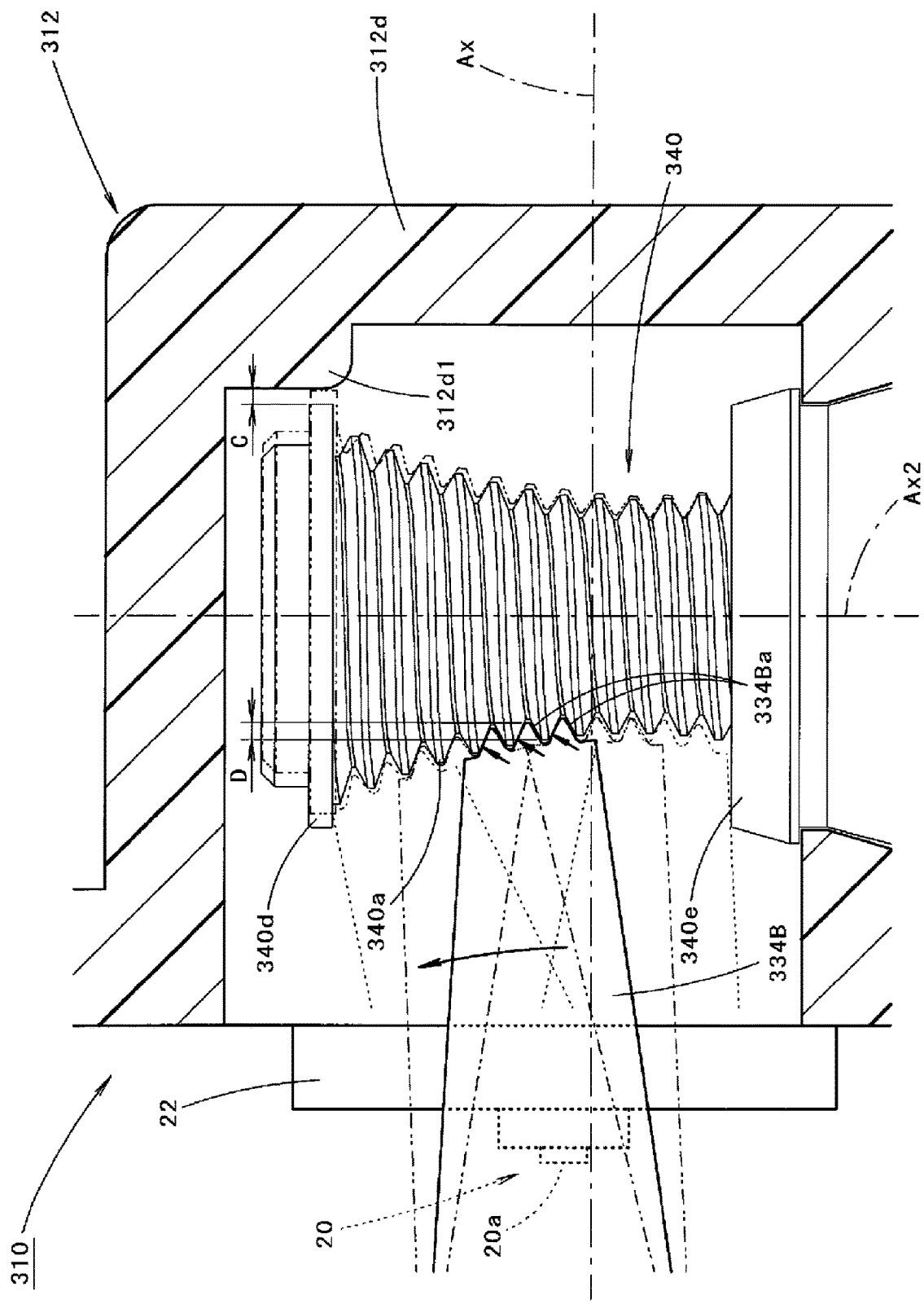
FIG. 9 is a partial enlarged view of FIG. 8.

FIG. 9 is a partial enlarged view of FIG. 8.

As also shown in FIG. 9, each groove portion 334Ba has a substantially wedge-like vertical section and is formed to extend linearly in the vehicle width direction. The value of the vertical width of each groove portion 334Ba is set to the same value as the pitch of the threaded portion 340a of the optical axis adjustment screw 340.

Excessive-rotation restricting portions 340d, 340e are formed on the upper and lower sides of the threaded portion 340a of the optical axis adjustment screw 340. The upper excessive-rotation restricting portion 340d is formed in a disk shape. The lower excessive-rotation restricting portion 340e is formed in a truncated cone shape. The excessive-rotation restricting portions 340d, 340e have a diameter larger than that of the upper end edge of the threaded portion 340a.

When the optical member 330 is pivoted from the pivot reference position by a predetermined angle or more beyond the normal optical axis adjustment angle range, the excessive-rotation restricting portions 340d, 340e come into contact with the upper end edge or lower end edge of the rear end portion of the protruding piece 334B to restrict further rotation of the optical member 330. For example, as shown in FIG. 9, when the optical member 330 is pivoted by a predetermined angle or more beyond the angle range (e.g., a range of about ±4°) indicated by a two-dot chain line and pivoted more than the angle range (e.g., a range of about ±11°) indicated by a broken line, the excessive-rotation restricting portions 340d, 340e are brought into contact with the upper end edge or lower end edge of the rear end portion of the protruding piece 334B, and further rotation of the optical member 330 is restricted.

On the upper portion of the inner surface of the rear wall in an overhang portion 312d of the lamp body 312, a detachment preventing portion 312d1 is formed to prevent that the groove portions 334Ba of the protruding piece 334B are disengaged from the screwed state with the threaded portion 340a of the optical axis adjustment screw 340 due to the bending deformation of the optical axis adjustment screw 340. The detachment preventing portion 312d1 is formed to protrude from the overhang portion 312d toward the interior of the lamp chamber in a positional relationship in close proximity to the outer peripheral surface of the upper excessive-rotation restricting portion 340d.

Specifically, when the dimension of the gap between the detachment preventing portion 312d1 and the outer peripheral surface of the upper excessive-rotation restricting portion 340d is defined as C, and the dimension of the effective teeth depth in the screwed state between the groove portions 334Ba of the protruding piece 334B and the threaded portion 340a of the optical axis adjustment screw 340 is defined as D, the detachment preventing portion 312d1 is formed such that the dimension C has a value smaller than the dimension D. The dimension C is, for example, a value of approximately C=0.2 to 0.6×D.

The function of the detachment preventing portion 312d1 will be described as follows.

Specifically, a rotational moment for rotating the protruding piece 334B in a direction to push it upward is generated on the optical member 330 (the rotational moment is indicated by an arrow in FIG. 8). Therefore, the threaded portion 340a of the optical axis adjustment screw 340 in the screwed state with the groove portions 334Ba of the protruding piece 334B comes into contact with the groove portions 334Ba of the protruding piece 334B at its downward inclined surface and is subjected to an upward pressing force (the pressing force is indicated by an arrow in FIG. 5).

In this manner, the upper end portion of the optical axis adjustment screw 340 tries to bend to the rear side of the lamp as indicated by a two-dot chain line in FIG. 9. However, when the optical axis adjustment screw 340 is bent and deformed to a certain extent, the upper excessive-rotation restricting portion 340d comes into contact with the detachment preventing portion 312d1, and further bending deformation of the optical axis adjustment screw 340 is restricted. As a result, it is prevented in advance that the groove portions 334Ba of the protruding piece 334B are disengaged from the screwed state with the threaded portion 340a.

Also when the configuration of the present modification is adopted, the same operational effects as those of the above embodiment can be obtained.

Moreover, in the present modification, the threaded portion 340a of the optical axis adjustment screw 340 is configured by a substantially upper half of an hourglass worm. Therefore, an upward pressing force applied to the screwed portion with the groove portions 334Ba of the protruding piece 334B can be efficiently received at the downward inclined surface of the threaded portion 340a. As a result, the screwed state between the protruding piece 334B and the optical axis adjustment screw 340 can be made more reliable.

Fourth Modification of First Embodiment

Next, a fourth modification of the first embodiment will be described.

Figure 10:
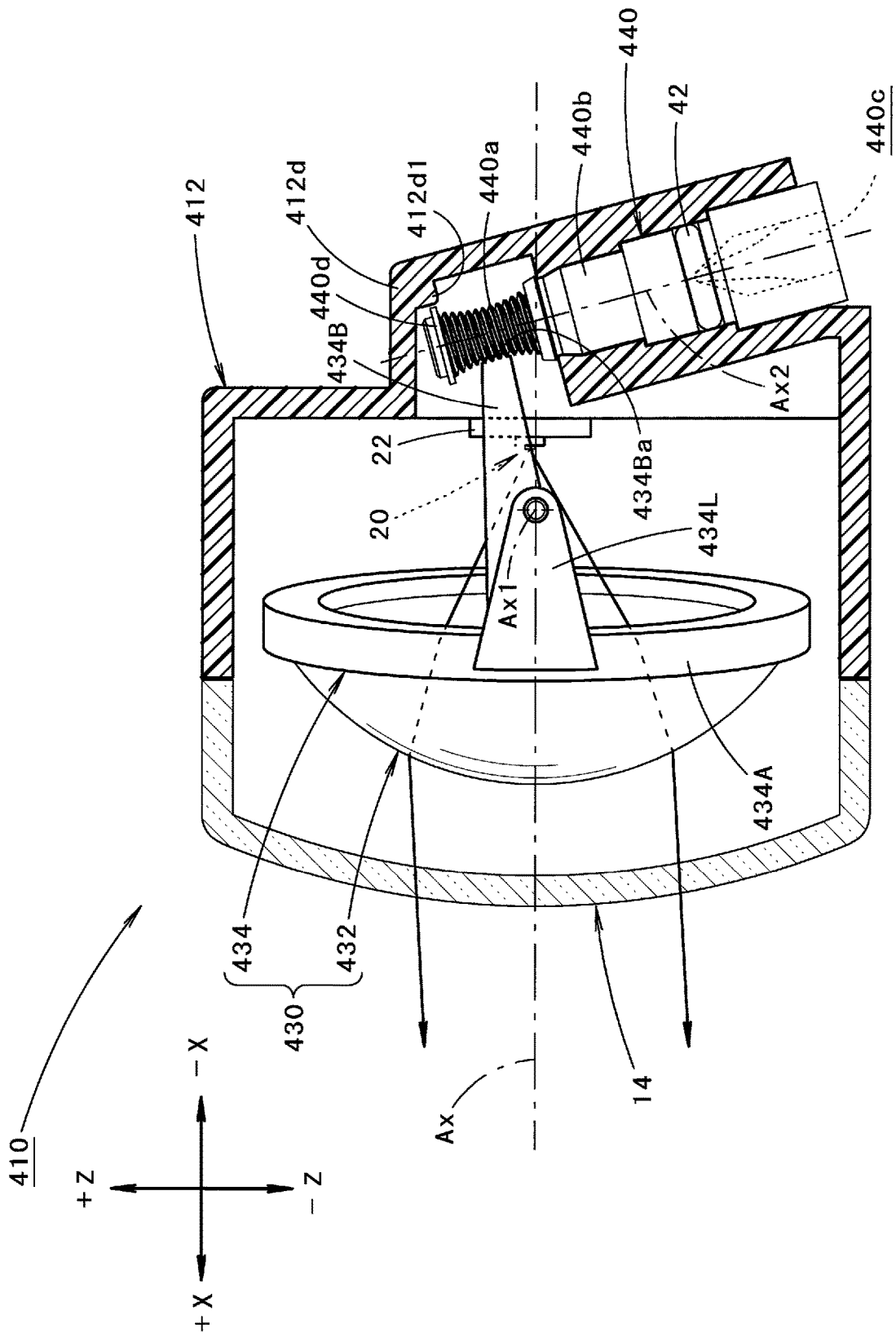
FIG. 10 is a view similar to FIG. 2, showing a partial enlarged view of a fourth modification.

FIG. 10 is a sectional view similar to FIG. 2, showing a vehicle lamp 410 according to the present modification.

As shown in FIG. 10, the basic configuration of the present modification is the same as that of the above embodiment, but the arrangement of an optical axis adjustment screw 440 is different from that of the optical axis adjustment screw 40 in the above embodiment. Accordingly, configurations of an optical member 430 and a lamp body 412 are also different from those in the above embodiment.

Specifically, the optical axis adjustment screw 440 of the present modification is arranged in a state obtained by pivoting the optical axis adjustment screw 40 of the above embodiment upward by a predetermined angle (e.g., about 10° to 30°) around the pivotal axis Ax1. The optical axis adjustment screw 440 is disposed in a state of being forwardly tilted toward the interior of the lamp chamber.

Also in the optical member 430 of the present modification, the configurations of a lens 432 and a body part 434A and leg parts 434L of a lens holder 434 are the same as those in the above embodiment, but the configuration of a protruding piece 434B is different from that of the protruding piece 34B in the above embodiment.

Specifically, similar to the protruding piece 34B of the above embodiment, the protruding piece 434B of the present modification is formed to extend in a plate shape along a vertical plane parallel to the optical axis Ax near the right side of the left leg part 434L. On the rear end surface of the protruding piece 434B, a plurality of (specifically, two) groove portions 434Ba to be screwed with a threaded portion 440a of the optical axis adjustment screw 440 is formed to extend in the vehicle width direction.

On the other hand, the protruding piece 434B of the present modification is different from the protruding piece 34B of the above embodiment in that the plurality of groove portions 434Ba is configured to be screwed with the threaded portion 440a at a substantially central position (i.e., the position above the optical axis Ax) of the formation region of the threaded portion 440a of the optical axis adjustment screw 440 in the upper and lower direction when the optical member 430 is in the pivot reference position.

The lamp body 412 of the present modification is different from that of the above embodiment in the shape of an overhang portion 412d. A detachment preventing portion 412d1 is formed on the upper portion of the inner surface of the rear wall in the overhang portion 412d of the lamp body 412. The detachment preventing portion 412d1 is a member for preventing that the groove portions 434Ba of the protruding piece 434B are disengaged from the screwed state with the threaded portion 440a of the optical axis adjustment screw 440 due to the bending deformation of the optical axis adjustment screw 440. The detachment preventing portion 412d1 is formed to protrude into the lamp chamber in a positional relationship in close proximity to the outer peripheral surface of an upper excessive-rotation restricting portion 440d.

Also when the configuration of the present modification is adopted, the same operational effects as those of the above embodiment can be obtained.

Moreover, in the present modification, the optical axis adjustment screw 440 is disposed in a state of being tilted forward. Therefore, an upward pressing force applied to the optical axis adjustment screw 440 at the screwed portion with the groove portions 434Ba of the protruding piece 434B can be efficiently received at the downward inclined surface of the threaded portion 440a. In this way, the screwed state between the groove portions 434Ba of the protruding piece 434B and the threaded portion 440a of the optical axis adjustment screw 440 can be made more reliable.

Second Embodiment

Hereinafter, a second embodiment of the disclosure will be described with reference to the drawings. Meanwhile, the same or similar parts as in the first embodiment are denoted by the same reference numerals in the drawings, and the description thereof will be omitted or simplified.

Figure 11:
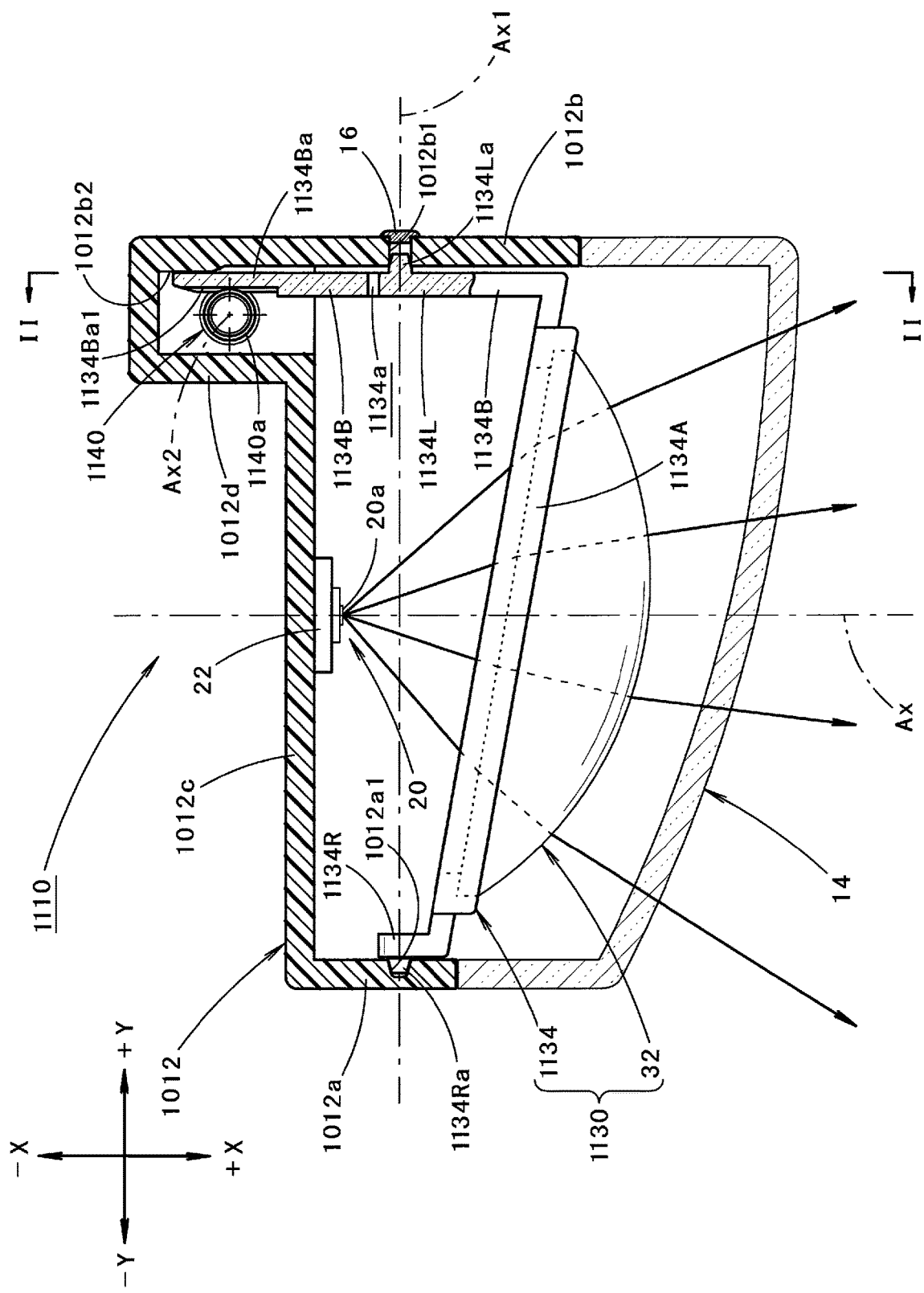
FIG. 11 is a sectional view showing a vehicle lamp according to a second embodiment.

FIG. 11 is a sectional view showing a vehicle lamp 1110 according to the second embodiment. Further, FIG. 12 is a sectional view taken along the line II-II in FIG. 11.

Figure 12:
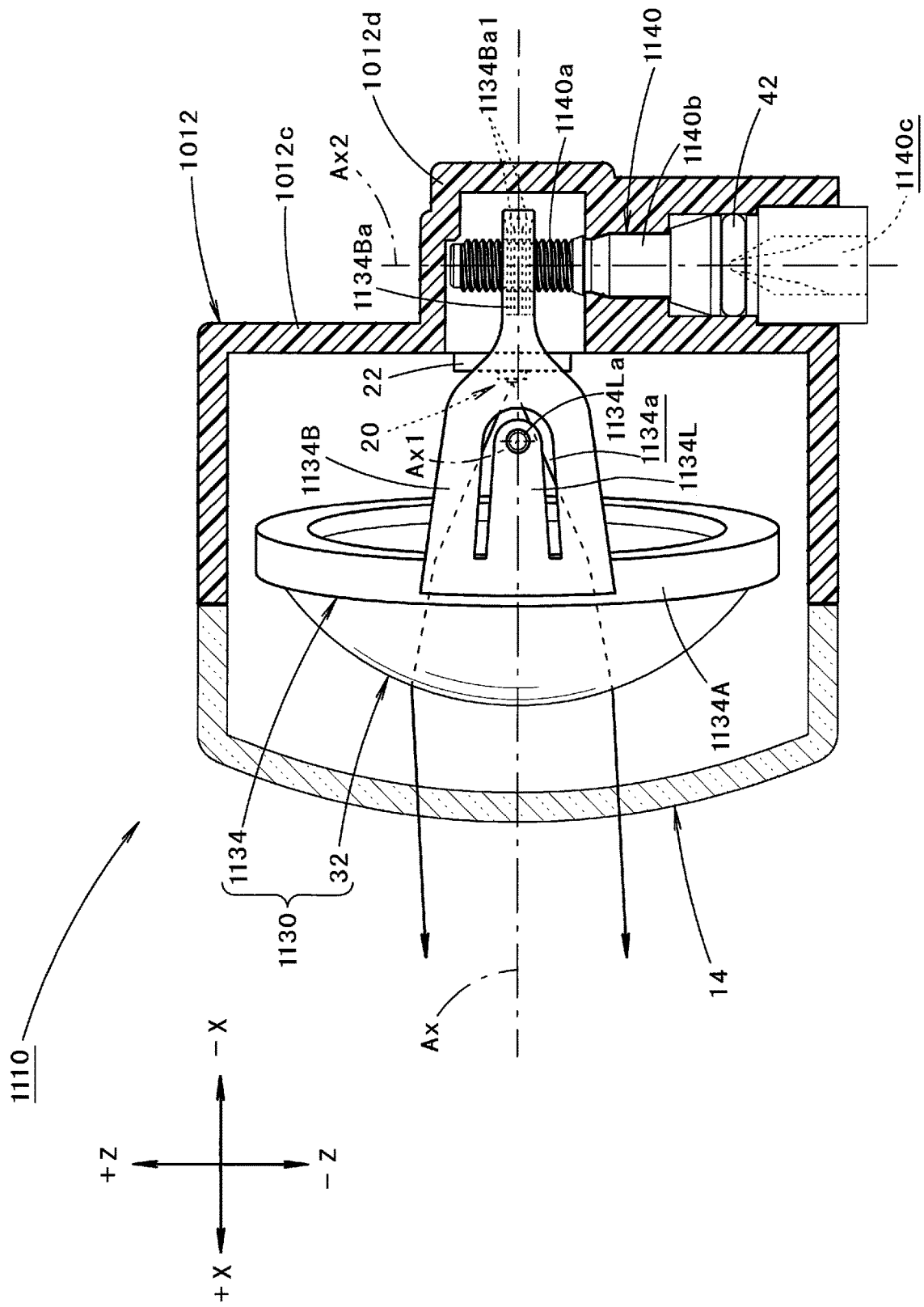
FIG. 12 is a sectional view taken along the line II-II in FIG. 11.

As shown in FIGS. 11 and 12, the vehicle lamp 1110 is a fog lamp provided in a right front end portion of a vehicle. The vehicle lamp 1110 is configured so that the light source 20 and an optical member 1130 for controlling the distribution of light from the light source 20 are accommodated in a lamp chamber defined by a lamp body 1012 as a housing and the plain transparent cover 14 attached to the front end opening thereof. The lamp body 1012 is composed of an elastically deformable member.

The optical member 1130 includes the lens 32 for controlling the deflection of light emitted from the light source 20 and a lens holder 1134 for supporting the lens 32. The lens 32 and the lens holder 1134 are members made of transparent resin and are integrated by welding, fitting or the like.

The lens holder 1134 is configured as a ring-shaped member for supporting an outer peripheral edge of the lens 32. The lens holder 1134 has a body part 1134A formed to be inclined toward the rear of the lamp from the left end portion to the right end portion along the rear surface of the lens 32, and a pair of leg parts 1134L, 1134R formed on both left and right sides of the body part 1134A. The left leg part 1134L and the right leg part 1134R are composed of elastically deformable members. Furthermore, the left leg part 1134L and the right leg part 1134R are configured to be elastically deformed independently of each other.

Similar to the optical member 30 of the above embodiment, the optical member 1130 is supported at the pair of left and right leg parts 1134L, 1134R to be pivotable around the pivotal axis Ax1 extending in the vehicle width direction (i.e., the horizontal direction orthogonal to the optical axis Ax) with respect to the lamp body 1012. The vehicle width direction is a direction intersecting the front and rear direction of the vehicle lamp 1110 and is an example of the first direction.

The specific configuration for realizing this is as follows.

Specifically, the pair of left and right leg parts 1134L, 1134R are both formed to protrude to both sides in the left and right direction from both left and right sides of the body part 1134A of the lens holder 1134 in a plan view, and then, to extend in a plate shape toward the rear of the vehicle lamp 1110. Fulcrum protrusions 1134La, 1134Ra protruding outward on the pivotal axis Ax1 are formed on the outer surfaces (i.e., the side surface opposite to the optical axis Ax) of the rear end portions of the leg parts 1134L, 1134R, respectively.

Similar to the leg parts 34L, 34R of the above embodiment, the pair of left and right leg parts 1134L, 1134R are both formed to extend in a tongue shape from the body part 1134A of the lens holder 1134 toward the rear of the lamp in a side view. The pair of left and right fulcrum protrusions 1134La, 1134Ra are formed in the same manner as the fulcrum protrusions 34La, 34Ra in the above embodiment.

Further, the optical member 1130 is configured so that the fulcrum protrusion 1134Ra of the right leg part 1134R of the lens holder 1134 is inserted into a recessed portion 1012a1 formed on the inner surface of a right wall 1012a of the lamp body 1012 and the fulcrum protrusion 1134La of the left leg part 1134L of the lens holder 1134 is inserted into a through-hole 1012b1 formed in a left wall 1012b of the lamp body 1012. In this way, the optical member 1130 is supported to be pivotable around the pivotal axis Ax1 with respect to the lamp body 1012.

Figure 13:
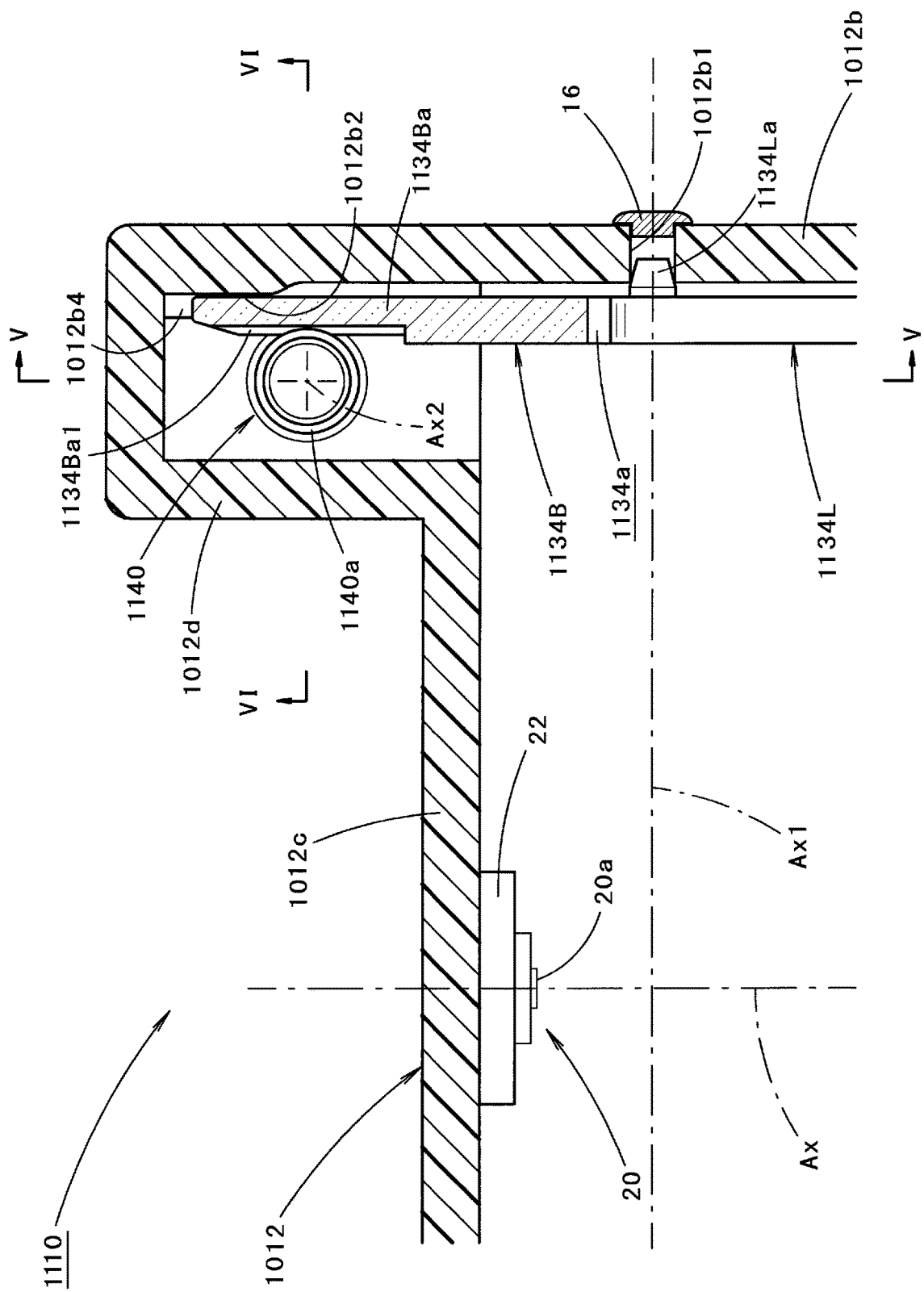
FIG. 13 is a partial enlarged view of FIG. 11.
Figure 14:
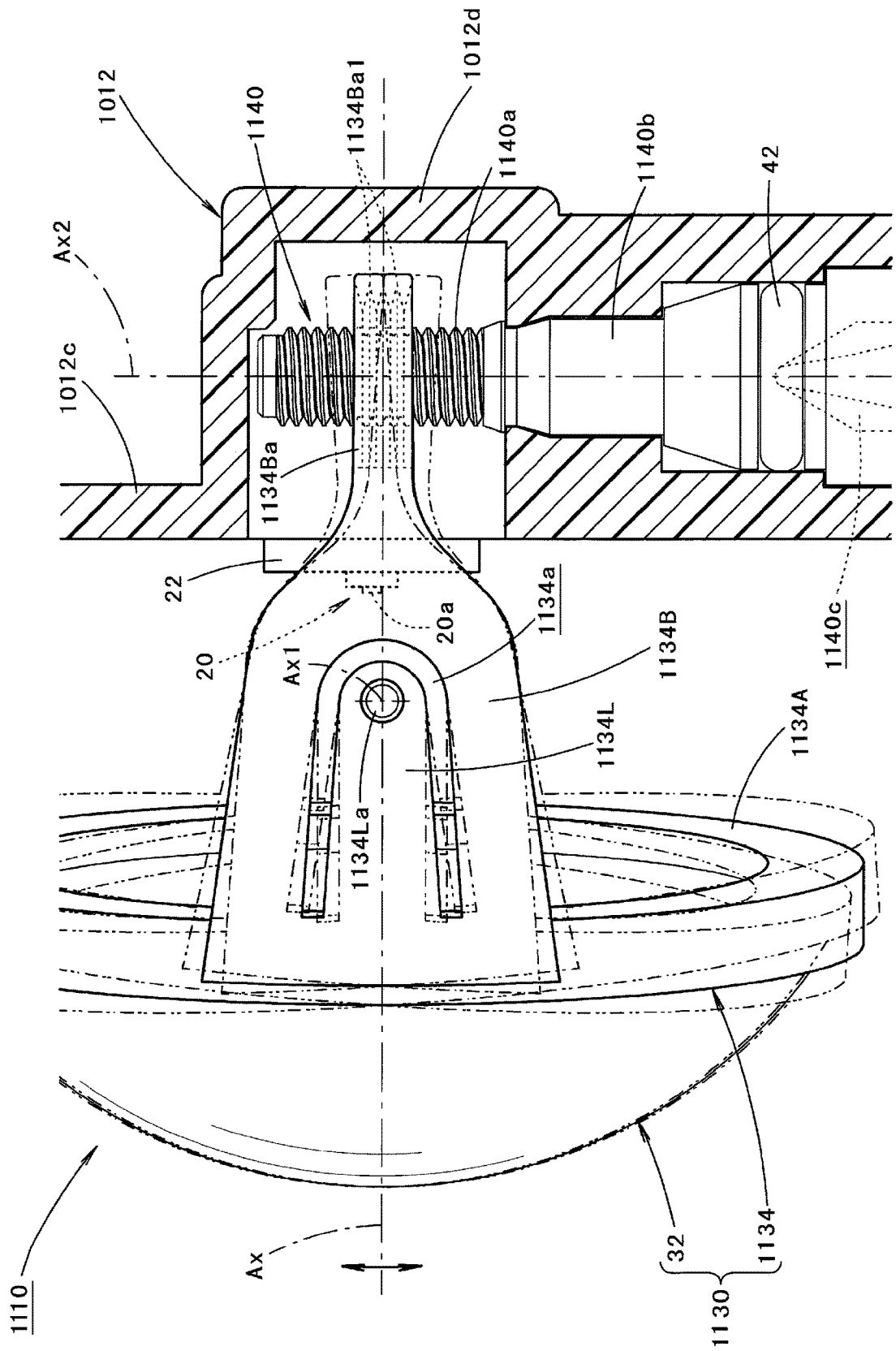
FIG. 14 is a partial enlarged view of FIG. 12.

FIG. 13 is a partial enlarged view of FIG. 11, and FIG. 14 is a partial enlarged view of FIG. 12.

As also shown in FIGS. 13 and 14, the left rear end portion of the lamp body 1012 is configured as an overhang portion 1012d overhanging from a rear surface wall 1012c toward the rear of the vehicle lamp 1110. An optical axis adjustment screw 1140 for pivoting the optical member 1130 around the pivotal axis Ax1 is supported on the lower wall of the overhang portion 1012d so as to be rotatable around the axis Ax2 extending in the vertical direction (an example of the second direction). The second direction is a direction intersecting the first direction and the front and rear direction of the vehicle lamp 1110.

The optical axis adjustment screw 1140 is a member made of resin. As shown in FIGS. 12 and 14, the optical axis adjustment screw 1140 is formed so that its diameter gradually decreases from the lower end portion to the upper end portion. A threaded portion 1140a is formed at the upper end portion of the optical axis adjustment screw 1140. The threaded portion 1140a is configured by a metric screw. Further, the optical axis adjustment screw 1140 is supported by the lamp body 1012 at a shaft portion 1140b located in the middle of the optical axis adjustment screw 1140 in a state where the threaded portion 1140a is exposed to the inside of the lamp chamber and the lower end portion of the optical axis adjustment screw 1140 is exposed to the space outside the lamp chamber.

A protruding piece 1134B extending toward the rear of the vehicle lamp 1110 is formed on the left portion of the lens holder 1134, as shown in FIGS. 11 and 13. The protruding piece 1134B is formed to extend in a plate shape on the same vertical plane as the left leg part 1134L. A rear end edge of the protruding piece 1134B is located on the rear side of the vehicle lamp 1110 with respect to the pivotal axis Ax1 and further on the rear side of the vehicle lamp 1110 than the optical axis adjustment screw 1140.

The protruding piece 1134B is formed so that a portion from the body part 1134A of the lens holder 1134 to a position on the rear side of the vehicle lamp 1110 with respect to the pivotal axis Ax1 surrounds the left leg part 1134L via a substantially U-shaped slit 1134a in a side view, as shown in FIGS. 12 and 14. In other words, the protruding piece 1134B is formed to surround the leg part 1134L at the same position as the leg part 1134L in the vehicle width direction.

A rear region 1134Ba located on the rear side of the vehicle lamp 1110 than the slit 1134a is formed to extend toward the rear of the vehicle lamp 1110 with a substantially constant vertical width at the same height position as the position of the optical axis Ax in the +Z to −Z direction.

The protruding piece 1134B has an outer surface formed in a single plane shape.

The outer surface of the protruding piece 1134B is a side surface which is located on the side far from the optical axis Ax as shown in FIGS. 11 and 13 and located on the side opposite to the optical axis Ax as shown in FIGS. 11 and 13, out of the side surfaces of the protruding piece 1134B in the +Y to −Y direction. The outer surface of the protruding piece 1134B means a side surface located on the side opposite to an inner surface of the protruding piece 1134B in the first direction.

An inner surface of the protruding piece 1134B means a side surface which is located on the side close to the optical axis Ax as shown in FIGS. 11 and 13 and located at the center side of the optical member 1130 in the first direction, out of the side surfaces of the protruding piece 1134B in the +Y to −Y direction.

As shown in FIG. 13, a step is formed in the middle of the rear region 1134Ba on the inner surface of the protruding piece 1134B. The portion of the rear region 1134Ba located on the rear side of the vehicle lamp 1110 than the step is thinner than the other general portions (the portion of the rear region 1134Ba other than the step). Further, a plurality of (specifically, three) groove portions 1134Ba1 for screwing with the optical axis adjustment screw 1140 are formed on an inner surface of the thinned portion. Meanwhile, the portions located on both upper and lower sides of the plurality of groove portions 1134Ba1 on the inner surface of the rear region 1134Ba are formed such that the cross-sectional shape in the vertical direction has a shape in which one-side portion of the groove portions 1134Ba1 is extended.

By unifying the protruding piece 1134B in this manner, the weight reduction and space saving of the optical member 1130 can be achieved.

When the optical member 1130 is in the pivot reference position which is the reference position for adjusting the optical axis, the plurality of groove portions 1134Ba1 are screwed with the threaded portion 1140a of the optical axis adjustment screw 1140 with the same height position as the optical axis Ax as the center.

In this manner, the leg parts 1134L, 1134R extending toward the rear of the vehicle lamp 1110 are formed at the end portion of the optical member 1130 in the first direction, and the fulcrum protrusions 1134La, 1134Ra for supporting the optical member 1130 pivotably around the pivotal axis Ax1 by the engagement with the lamp body 1012 are formed at positions on the pivotal axis Ax1 on the outer surfaces of the leg parts 1134L, 1134R. Therefore, the following operational effects can be obtained.

Specifically, when assembling the vehicle lamp 1110, the protruding piece 1134B and the leg parts 1134L, 1134R can be elastically deformed independently of each other by respectively abutting against the wall surface of the lamp body 1012. In this way, an operation of screwing the groove portions 1134Ba1 of the protruding piece 1134B with the optical axis adjustment screw 1140 and an operation of engaging the fulcrum protrusions 1134La, 1134Ra of the leg parts 1134L, 1134R with the lamp body 1012 can smoothly performed.

At that time, the leg parts 1134L, 1134R are formed in a tongue shape toward the rear of the lamp, and the protruding piece 1134B is formed to surround the leg parts 1134L, 1134R at substantially the same position as the leg parts 1134L, 1134R in the first direction. With such a configuration, the required width of the vehicle lamp 1110 in the first direction can be suppressed to the minimum, and the protruding piece 1134B and the leg parts 1134L, 1134R can be elastically deformed in a stable manner, respectively.

Figure 15:
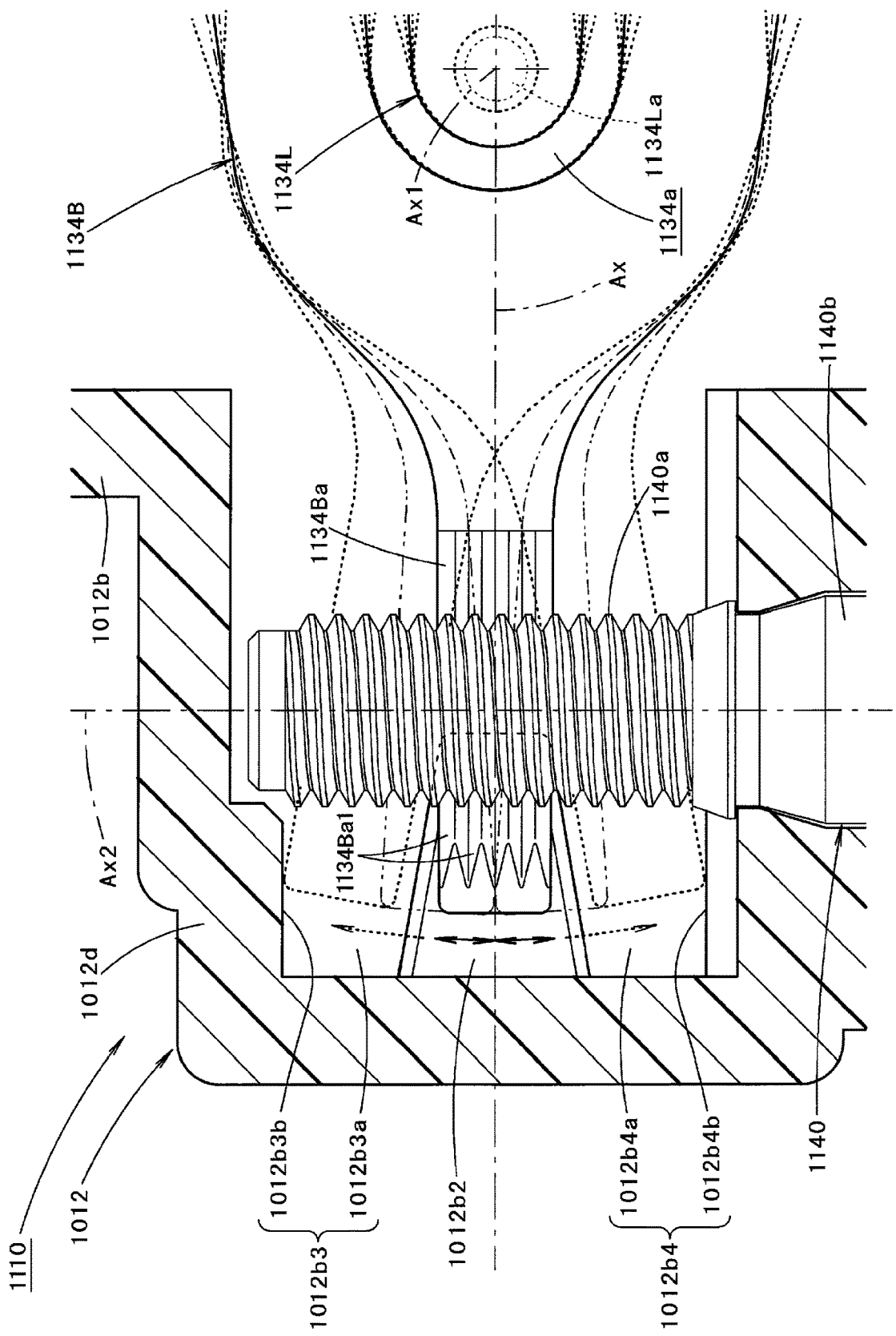
FIG. 15 is a sectional view taken along the line V-V in FIG. 13.
Figure 16:
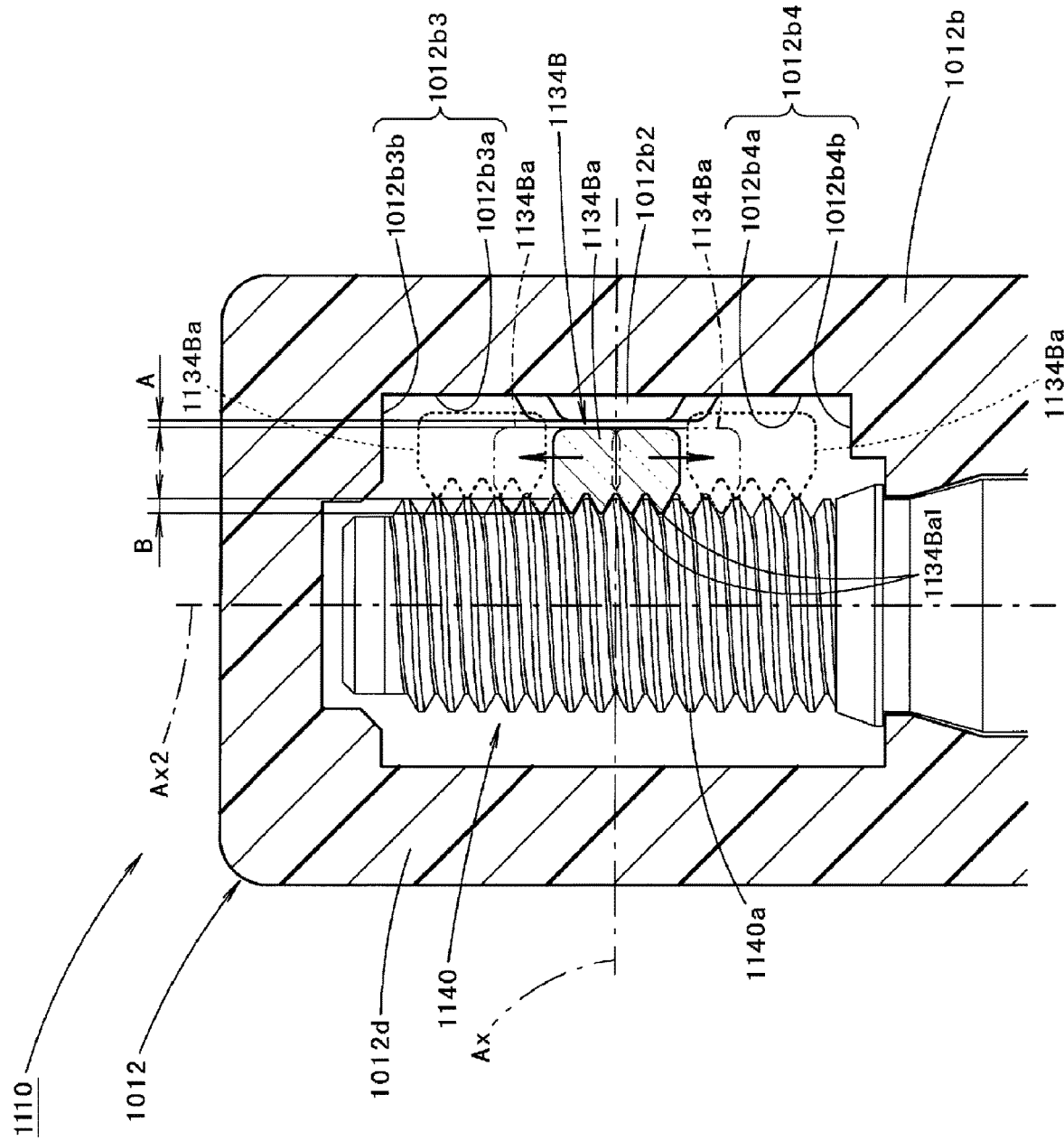
FIG. 16 is a sectional view taken along the line VI-VI in FIG. 13.

FIG. 15 is a sectional view taken along the line V-V in FIG. 13, and FIG. 16 is a sectional view taken along the line VI-VI in FIG. 13.

As shown in FIGS. 15 and 16, each groove portion 1134Ba1 has a substantially wedge-like vertical section and is formed to extend in the front and rear direction of the lamp. The vertical width (plate thickness) of each groove portion 1134Ba1 is set to the same value (the same width) as the pitch of the threaded portion 1140a of the optical axis adjustment screw 1140.

In the rear region 1134Ba of the protruding piece 1134B, a portion near the rear end edge of the inner surface is formed in a tapered shape in a plan view, and accordingly, the rear end surfaces of the plurality of groove portions 1134Ba1 are formed in a zigzag shape in a side view.

The inner surface of the left wall 1012b of the lamp body 1012 is formed to extend to the overhang portion 1012d while maintaining its smooth planar shape. A detachment preventing portion 1012b2 is formed at the rear end portion of the overhang portion 1012d to prevent the groove portions 1134Ba1 of the protruding piece 1134B from being disengaged from the screwed state with the optical axis adjustment screw 1140. The detachment preventing portion 1012b2 is formed by displacing a partial region of the rear end portion on the inner surface of the left wall 1012b inwardly to be thicker than the other general portions. The detachment preventing portion 1012b2 is formed in a positional relationship in close proximity to the outer surface of the rear region 1134Ba of the protruding piece 1134B.

Specifically, as shown in FIG. 16, when the dimension of the gap between the detachment preventing portion 1012b2 and the outer surface of the rear region 1134Ba of the protruding piece 1134B is defined as A, and the dimension of the effective teeth depth in the screwed state between the groove portions 1134Ba1 of the rear region 1134Ba of the protruding piece 1134B and the threaded portion 1140a of the optical axis adjustment screw 1140 is defined as B, the detachment preventing portion 1012b2 is formed such that the dimension A has a value smaller than the dimension B. The dimension A is, for example, a value of approximately A=0.2 to 0.6×B.

Here, the specific shape of the rear region 1134Ba of the protruding piece 1134B is not particularly limited as long as it can be elastically deformed by a pressing force from the detachment preventing portion 1012b2 of the housing such as the lamp body 1012.

Further, as shown in FIG. 15, the detachment preventing portion 1012b2 is formed to extend in an isosceles trapezoidal shape toward the front of the lamp about the same height position in the +Z to −Z direction as the optical axis Ax in a side view. A front end edge of the detachment preventing portion 1012b2 is located near the rear of the lamp with respect to the pivotal axis Ax1. The detachment preventing portion 1012b2 is formed so that its outer peripheral edge has a smooth curved surface shape, as shown in FIG. 16. Specifically, the outer peripheral surface of the detachment preventing portion 1012b2 is configured by an inclined surface extending in a direction inclined by about 30 to 45° with respect to the direction perpendicular to the inner surface of the left wall 1012b, and a corner R of R 0.5 to 1.0 mm is given to a ridge line portion between the outer peripheral surface and the inner surface of the detachment preventing portion 1012b2.

On the other hand, the corner R of about R 0.5 to 1.0 mm is also given to the ridge line portions between the outer surface and the upper end surface and the lower end surface of the protruding piece 1134B.

Meanwhile, the detachment preventing portion 1012b2 is formed in a positional relationship in proximity to or in contact with the outer surface of the rear region of the protruding piece 1134B. However, the specific positional relationship therebetween is not particularly limited as long as it is in a range capable of preventing the groove portions 1134Ba1 of the protruding piece 1134B and the optical axis adjustment screw 1140 from being disengaged from the screwed state.

The position indicated by a solid line in FIGS. 15 and 16 is the pivot reference position of the optical member 1130. A pair of upper and lower detachment permitting portions 1012b3, 1012b4 is formed on the inner surface of the left wall 1012b of the lamp body 1012 so as to allow the groove portion 1134Ba1 of the protruding piece 1134B to be disengaged from the screwed state with the threaded portion 1140a of the optical axis adjustment screw 1140 when the optical member 1130 is pivoted by a predetermined angle or more around the pivotal axis Ax1 from the pivot reference position.

The upper detachment permitting portion 1012b3 is composed of a side surface portion 1012b3a displaced to the outer surface side with respect to the detachment preventing portion 1012b2 and an upper surface portion 1012b3b formed at a position away from the optical axis Ax by a predetermined distance upward. The lower detachment permitting portion 1012b4 is composed of a side surface portion 1012b4a displaced to the outer surface side with respect to the detachment preventing portion 1012b2 and a lower surface portion 1012b4b formed at a position away from the optical axis Ax by a predetermined distance downward. The side surface portions 1012b3a, 1012b4a are formed to be flush with the general portions of the inner surface of the left wall 1012b. Further, the upper surface portion 1012b3b and the lower surface portion 1012b4b are formed at positions where the protruding piece 1134B comes into contact when the optical member 1130 is pivoted by a predetermined angle or more beyond the normal optical axis adjustment angle range (that is, the angle range indicated by a two-dot chain line in FIG. 15) from the pivot reference position (that is, the optical member 1130 is pivoted to the position indicated by a broken line in FIG. 15). The angle range indicated by a two-dot chain line in FIG. 15 is, for example, a range of about ±4°. The angle range indicated by a broken line in FIG. 15 is, for example, a range of about ±11°.

The function of each of the detachment permitting portions 1012b3, 1012b4 will be described as follows.

Specifically, when the rotational operation of the optical axis adjustment screw 1140 is excessively performed, and hence, the optical member 1130 is pivoted by an angle more than necessary from the pivot reference position, the rear end portion of the protruding piece 1134B comes into contact with the upper surface portion 1012b3b or the lower surface portion 1012b4b of the detachment permitting portion 1012b3 to restrict further rotation of the optical member 1130, as indicated by a broken line in FIG. 15. When the rotational operation of the optical axis adjustment screw 1140 is further performed from this state, the protruding piece 1134B tries to be displaced in a direction (that is, to the outer surface side) away from the axis Ax2 by a pressing force from the threaded portion 1140a, as indicated by a broken line in FIG. 16. At that time, since the side surface portions 1012b3a, 1012b4a of the detachment permitting portions 1012b3, 1012b4 are displaced to the outer surface side with respect to the detachment preventing portion 1012b2, the groove portions 1134Ba1 of the protruding piece 1134B is disengaged from the screwed state with the threaded portion 1140a of the optical axis adjustment screw 1140, and the optical axis adjustment screw 1140 is idled.

Meanwhile, the protruding piece 1134B is biased in a direction approaching the axis Ax2 by its elastic force even in such an idling state. Therefore, when a rotational operation for turning the optical axis adjustment screw 1140 in the reverse direction is performed, the groove portion 1134Ba1 of the protruding piece 1134B is screwed again with the threaded portion 1140a of the optical axis adjustment screw 1140, and the optical member 1130 is pivoted in a direction approaching the pivot reference position.

At that time, the outer peripheral surface of the detachment preventing portion 1012b2 is configured as an inclined surface, the corner R is given to the ridge line portion between the outer peripheral surface and the inner surface, and the corner R is also given to the ridge line portion of the protruding piece 1134B. Therefore, the groove portions 1134Ba1 of the protruding piece 1134B can be extremely smoothly detached from or returned to the screwed state with the threaded portion 1140a of the optical axis adjustment screw 1140.

Figure 17:
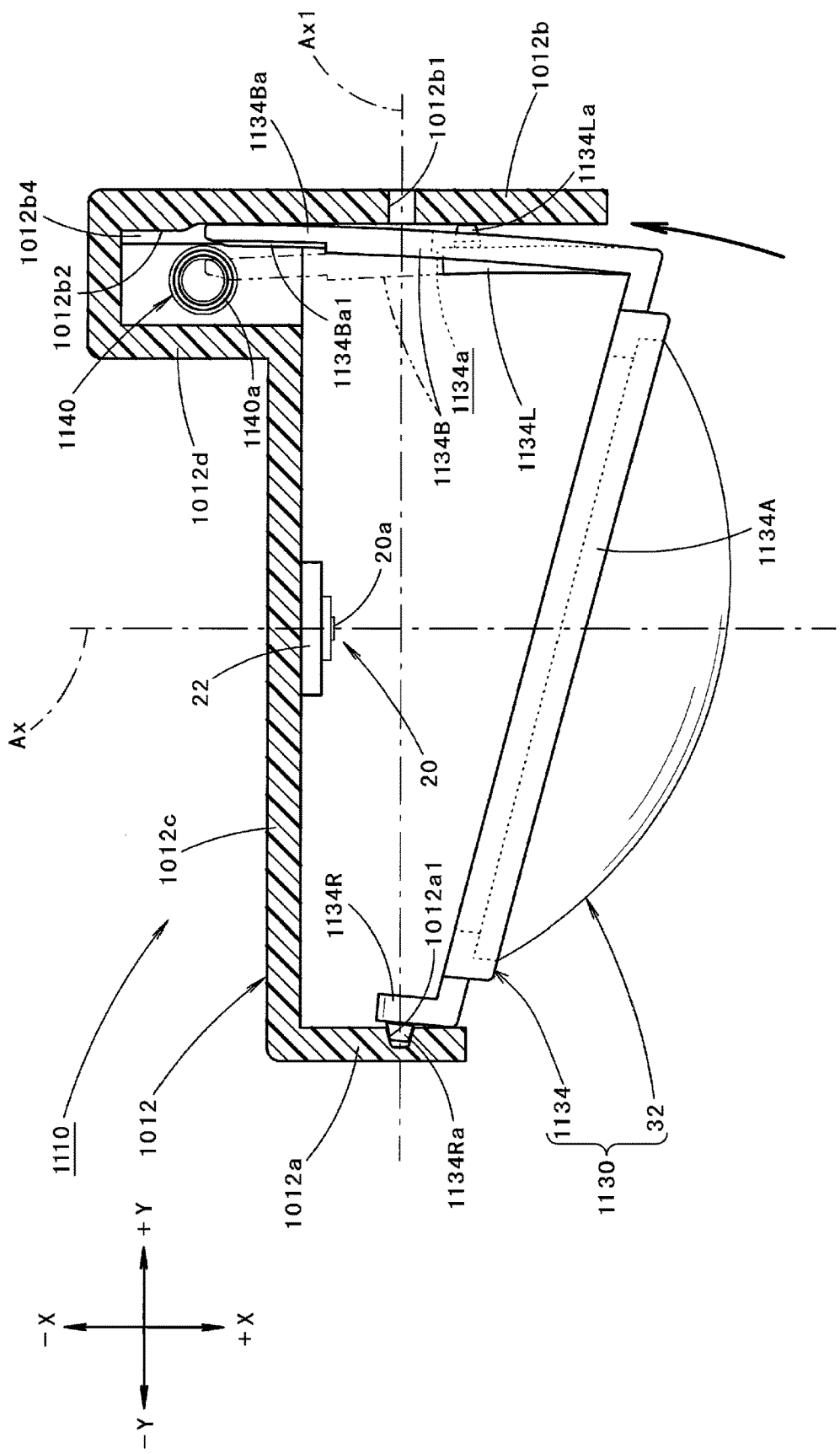
FIG. 17 is a view for explaining the operation of the second embodiment.

FIG. 17 is a view similar to FIG. 11, showing a state where the optical member 1130 is assembled to the lamp body 1012 in the present embodiment.

As shown in FIG. 17, in a state where the optical member 1130 is tilted, the rear end portion of the protruding piece 1134B and the fulcrum protrusion 1134La of the left leg part 1134L are elastically deformed by respectively abutting against the inner surface of the left wall 1012b of the lamp body 1012. In this state, the right leg part 1134R is inserted into the lamp body 1012, and the fulcrum protrusion 1134Ra of the right leg part 1134R is inserted into the recessed portion 1012a1 of the right wall 1012a of the lamp body 1012. Then, the optical member 1130 is pushed to pivot in the direction of the arrow shown in FIG. 17 around the fulcrum protrusion 1134Ra. In this way, the rear end portion of the protruding piece 1134B and the fulcrum protrusion 1134La of the left leg part 1134L are moved toward the rear of the lamp along the inner surface of the left wall 1012b of the lamp body 1012. Further, the rear end portion of the protruding piece 1134B rides on the detachment preventing portion 1012b2 formed on the rear end portion of the inner surface of the left wall 1012b, and then, the fulcrum protrusion 1134La of the left leg part 1134L is inserted into the through-hole 1012b1 of the left wall 1012b.

In this way, the optical member 1130 is supported to be pivotable around the pivotal axis Ax1 with respect to the lamp body 1012. At this time, the protruding piece 1134B is screwed with the threaded portion 1140a of the optical axis adjustment screw 1140 at the plurality of groove portions 1134Ba1 formed on the inner surface thereof, and the outer surface of the protruding piece 1134B comes close to the detachment preventing portion 1012b2 of the lamp body 1012.

As indicated by a two-dot chain line in FIG. 17, assuming that the optical member 1130 is configured such that the protruding piece 1134B and the left leg part 1134L are integrally formed, the protruding piece 1134B is separated from the inner surface of the left wall 1012b and the rear end portion thereof interferes with the optical axis adjustment screw 1140 when the fulcrum protrusion 1134La of the left leg part 1134L abuts against the inner surface of the left wall 1012b of the lamp body 1012. However, since the optical member 1130 of the present embodiment is configured such that the protruding piece 1134B and the left leg part 1134L are elastically deformed independently of each other, the optical member 1130 can be smoothly assembled without causing such a problem.

Next, operational effects of the present embodiment will be described.

The vehicle lamp 1110 according to the present embodiment includes the optical axis adjustment screw 1140 for pivoting the optical member 1130 with respect to the lamp body 1012 (housing) around the pivotal axis Ax1 extending in the vehicle width direction (the first direction intersecting the front and rear direction of the lamp). The optical axis adjustment screw 1140 is supported on the lamp body 1012 in a state of being disposed to extend in the vertical direction (the second direction intersecting the first direction and the front and rear direction of the lamp). The protruding piece 1134B extending toward the rear of the lamp is formed at the left end portion (the end portion in the first direction) of the optical member 1130. The groove portions 1134Ba1 to be screwed with the optical axis adjustment screw 1140 are formed on the inner surface of the rear region 1134Ba located on the lamp rear side of the protruding piece 1134B with respect to the pivotal axis Ax1. Further, the detachment preventing portion 1012b2 is formed in the lamp body 1012 so as to prevent the groove portions 1134Ba1 of the protruding piece 1134B from being disengaged from the screwed state with the threaded portion 1140a of the optical axis adjustment screw 1140. The detachment preventing portion 1012b2 is formed in a positional relationship in proximity to the outer surface of the rear region 1134Ba of the protruding piece 1134B. Therefore, the following operational effects can be obtained.

Specifically, since the detachment preventing portion 1012b2 is formed in the lamp body 1012, the screwed state between the groove portions 1134Ba1 of the protruding piece 1134B and the threaded portion 1140a of the optical axis adjustment screw 1140 can be maintained. In this way, it is possible to prevent in advance that the groove portions 1134Ba1 of the protruding piece 1134B are disengaged from the screwed state with the threaded portion 1140a of the optical axis adjustment screw 1140 due to vibration or the like of a vehicle. Therefore, even when the optical member 1130 is configured not to include a pair of protruding pieces unlike the prior art, the screwed state between the groove portions 1134Ba1 of the protruding piece 1134B and the optical axis adjustment screw 1140 can be maintained.

Therefore, when assembling the vehicle lamp 1110, it may be sufficient to screw the single protruding piece 1134B with the threaded portion 1140a of the optical axis adjustment screw 1140 at the groove portions 1134Ba. In this way, the degree of freedom in assembling the vehicle lamp 1110 can be increased, so that the assembling workability of the vehicle lamp 1110 can be enhanced.

In this way, according to the present embodiment, in the vehicle lamp 1110 configured to control the distribution of light from the light source 20 by the optical member 1130, the assembling workability of the vehicle lamp 1110 can be enhanced even when the optical member 1130 is configured to be pivotable with respect to the lamp body 1012.

Further, by unifying the protruding piece 1134B as in the present embodiment, the weight reduction and space saving of the optical member 1130 can be achieved.

In the present embodiment, the leg part 1134L extending toward the rear of the lamp is formed at the left end portion of the optical member 1130, and the fulcrum protrusion 1134La is formed at a position on the pivotal axis Ax1 on the outer surface of the leg part 1134L for supporting the optical member 1130 pivotably around the pivotal axis Ax1 by the engagement with the lamp body 1012. Therefore, when assembling the lamp, the protruding piece 1134B and the leg part 1134L can be elastically deformed independently of each other by respectively abutting against the inner surface of the left wall 1012b of the lamp body 1012. In this way, an operation of screwing the groove portions 1134Ba1 of the protruding piece 1134B with the threaded portion 1140a of the optical axis adjustment screw 1140 and an operation of inserting and engaging the fulcrum protrusion 1134La of the leg part 1134L into the through-hole 1012b1 of the lamp body 1012 can smoothly performed.

At that time, in the present embodiment, the leg part 1134L is formed in a tongue shape toward the rear of the lamp. Further, the protruding piece 1134B is formed to surround the leg part 1134L at the same position as the leg part 1134L in the vehicle width direction. Therefore, the required lateral width of the vehicle lamp 1110 can be suppressed to the minimum, and the protruding piece 1134B and the leg part 1134L can be elastically deformed in a stable manner, respectively.

Furthermore, in the present embodiment, the detachment permitting portions 1012b3, 1012b4 are formed in the lamp body 1012 so as to allow the groove portions 1134Ba1 of the protruding piece 1134B to be disengaged from the screwed state with the threaded portion 1140a of the optical axis adjustment screw 1140 when the optical member 1130 is pivoted by a predetermined angle or more from the pivot reference position. Therefore, the following operational effects can be obtained.

That is, when the rotational operation of the optical axis adjustment screw 1140 is excessively performed, the optical member 1130 is pivoted by an angle more than necessary from the pivot reference position. Thus, when the optical member 1130 is pivoted by a predetermined angle or more from the pivot reference position, the optical axis adjustment screw 1140 can be idled by disengaging the groove portions 1134Ba1 of the protruding piece 1134B from the screwed state with the threaded portion 1140a of the optical axis adjustment screw 1140. In this way, the rotation amount of the optical member 1130 can be suppressed within a suitable angle range. In addition, it is possible to prevent in advance that the groove portions 1134Ba1 of the protruding piece 1134B and the threaded portion 1140a of the optical axis adjustment screw 1140 are inadvertently damaged at the screwed portion.

In the above configuration, when the protruding piece 1134B is configured such that the rear region 1134Ba can be elastically deformed by a pressing force from the detachment preventing portion 1012b2 of the lamp body 1012, it is possible to prevent in advance that an excessive load occurs at the time of operating the optical axis adjustment screw 1140 even when the detachment preventing portion 1012b2 is formed in a positional relationship in contact with the outer surface of the rear region 1134Ba of the protruding piece 1134B. In this way, the operability of the optical axis adjustment screw 1140 can be secured, and the screwed state between the groove portions 1334Ba1 of the protruding piece 1334B and the optical axis adjustment screw 1140 can be reliably maintained.

In the present embodiment, three groove portions 1134Ba1 are formed on the rear region 1134Ba of the protruding piece 1134B. However, two or less or four or more groove portion 1134Ba1 may be formed.

In the present embodiment, the optical member 1130 has a configuration in which the lens 32 is supported on the lens holder 1134. However, the lens 32 and the lens holder 1134 may be configured as a single member.

In the present embodiment, the light source 20 is supported on the rear surface wall 1012c of the lamp body 1012 via the substrate 22. However, the disclosure is not limited to this configuration. The light source 20 may be supported on a socket via the substrate 22, and the socket may be detachably mounted to the rear surface wall 1012c of the lamp body 1012.

In the present embodiment, the housing supporting the optical member 1130 is configured as the lamp body 1012. However, other lamp components (for example, a frame member supported on the lamp body 1012, etc.) may be employed.

First Modification of Second Embodiment

Next, modifications of the second embodiment will be described.

First, a first modification of the second embodiment will be described.

Figure 18:
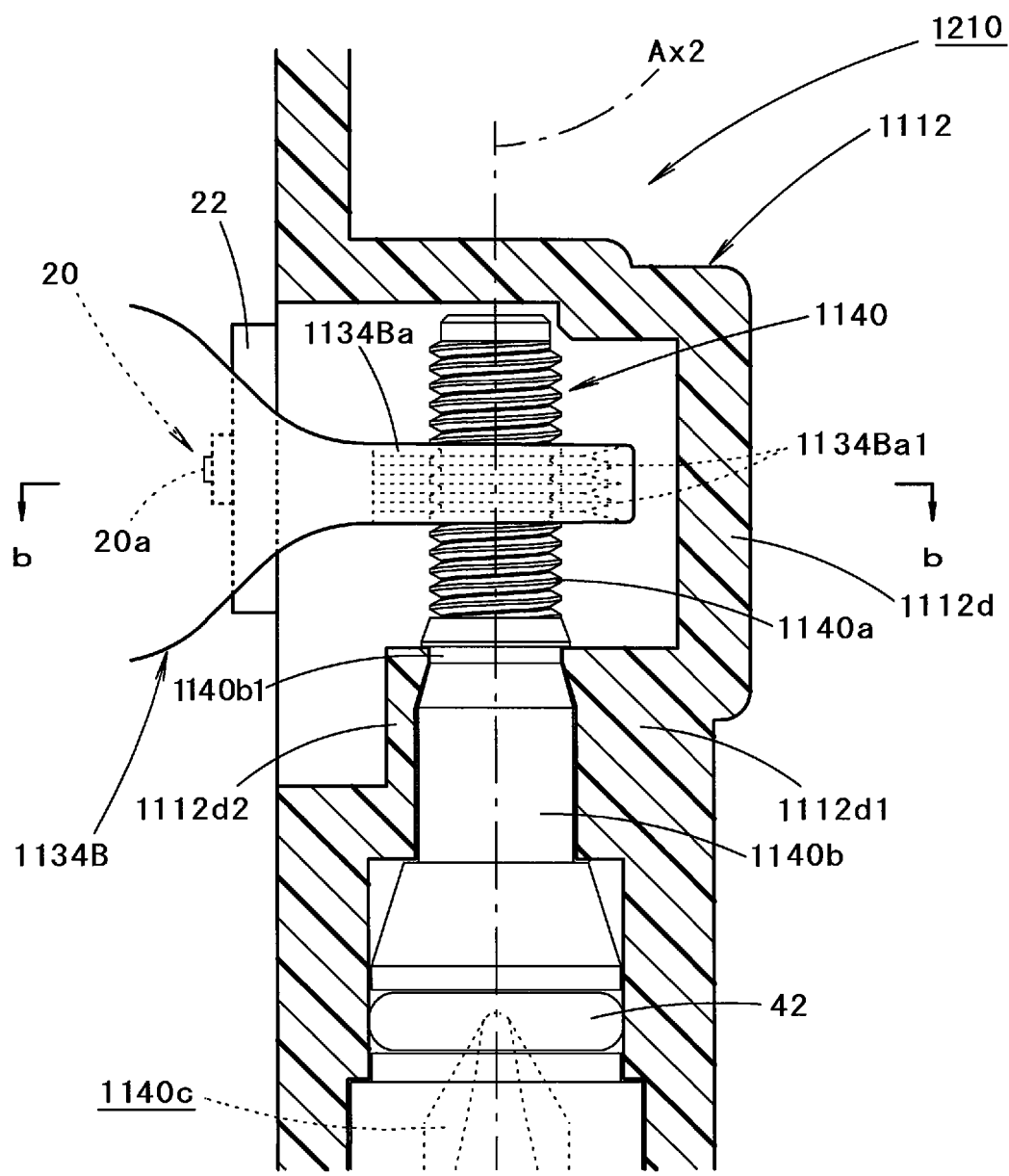
FIG. 18 is a view similar to FIG. 14, showing a partial enlarged view of a first modification of the second embodiment.
Figure 19:
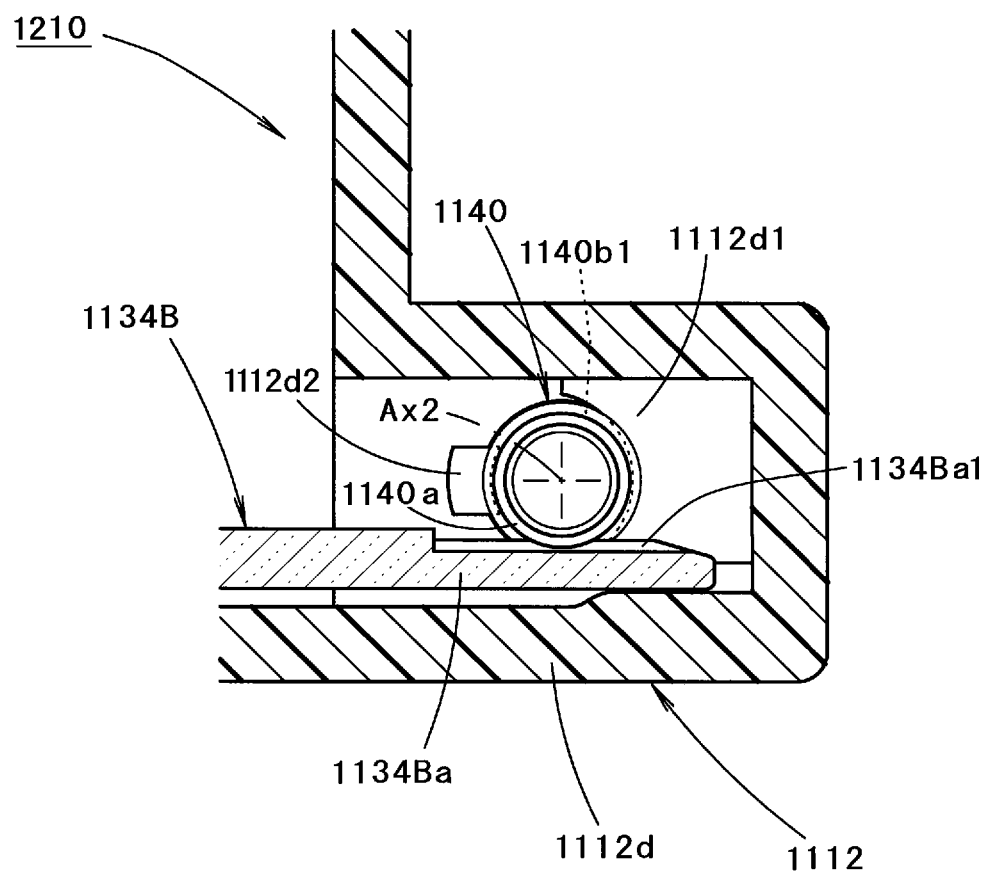
FIG. 19 is a sectional view taken along the line b-b in FIG. 18.

FIG. 18 is a view similar to FIG. 14, showing a partial enlarged view of a vehicle lamp 1210 according to the present modification. FIG. 19 is a sectional view taken along the line b-b in FIG. 18.

As shown in FIGS. 18 and 19, the basic configuration of the present modification is the same as that of the above embodiment, but the configuration of an overhang portion 1112d of a lamp body 1112 is partially different from that of the overhang portion 1012d in the above embodiment.

Specifically, the lamp body 1112 of the present modification has a configuration in which a bottom wall portion of the overhang portion 1112d is divided into a rear support portion 1112d1 located on the lamp rear side of the optical axis adjustment screw 1140 and a front support portion 1112d2 located on the front side of the optical axis adjustment screw 1140.

The optical axis adjustment screw 1140 is configured such that an upper end portion of the shaft portion 1140b is formed in a tapered shape toward the upper side and a lower end portion of the threaded portion 1140a is also formed in a tapered shape toward the upper side. Further, the uppermost end portion of the shaft portion 1140b located between the upper end portion and the lower end portion is configured as a neck portion 1140b1 having a small diameter.

The rear support portion 1112d1 is formed such that its front surface extends along an outer shape of the shaft portion 1140b of the optical axis adjustment screw 1140 in a side view. However, an upper end portion of the rear support portion 1112d1 has an arc shape having a radius of curvature larger than the radius of the neck portion 1140b1 in a plan view. Further, the upper end portion of the rear support portion 1112d1 is engaged with the neck portion 1140b1 at the rear position of the lamp with respect to the pivotal axis Ax1. However, the engagement width therebetween gradually decreases toward both left and right sides, and they are not engaged at both left and right ends.

On the other hand, the front support portion 1112d2 is configured, in front of the pivotal axis Ax1, as a protruding piece which protrudes upward and which has a lateral width narrower than the dimension of the outer diameter of the threaded portion 1140a and a longitudinal width narrower than the lateral width. The front support portion 1112d2 is formed such that its rear surface extends along an outer shape of the shaft portion 1140*b* of the optical axis adjustment screw 1140 in a side view. The front support portion 1112*d*2 is engaged with the neck portion 1140*b*1 at its upper end portion.

Further, in the present modification, the front support portion 1112*d*2 bends forward when the optical axis adjustment screw 1140 is inserted into the overhang portion 1112*d* of the lamp body 1112 from below. In this way, the upper end portion of the rear support portion 1112*d*1 is engaged with the neck portion 1140*b*1 of the optical axis adjustment screw 1140, and then, the upper end portion of the front support portion 1112*d*2 is engaged with the neck portion 1140*b*1 of the optical axis adjustment screw 1140.

When the configuration of the present modification is adopted, the optical axis adjustment screw 1140 can be easily assembled to the overhang portion 1112*d* of the lamp body 1112, and the optical axis adjustment screw 1140 can be reliably supported by the lamp body 1112 after the assembly is completed.

Second Modification of Second Embodiment

Next, a second modification of the second embodiment will be described.

Figure 20:
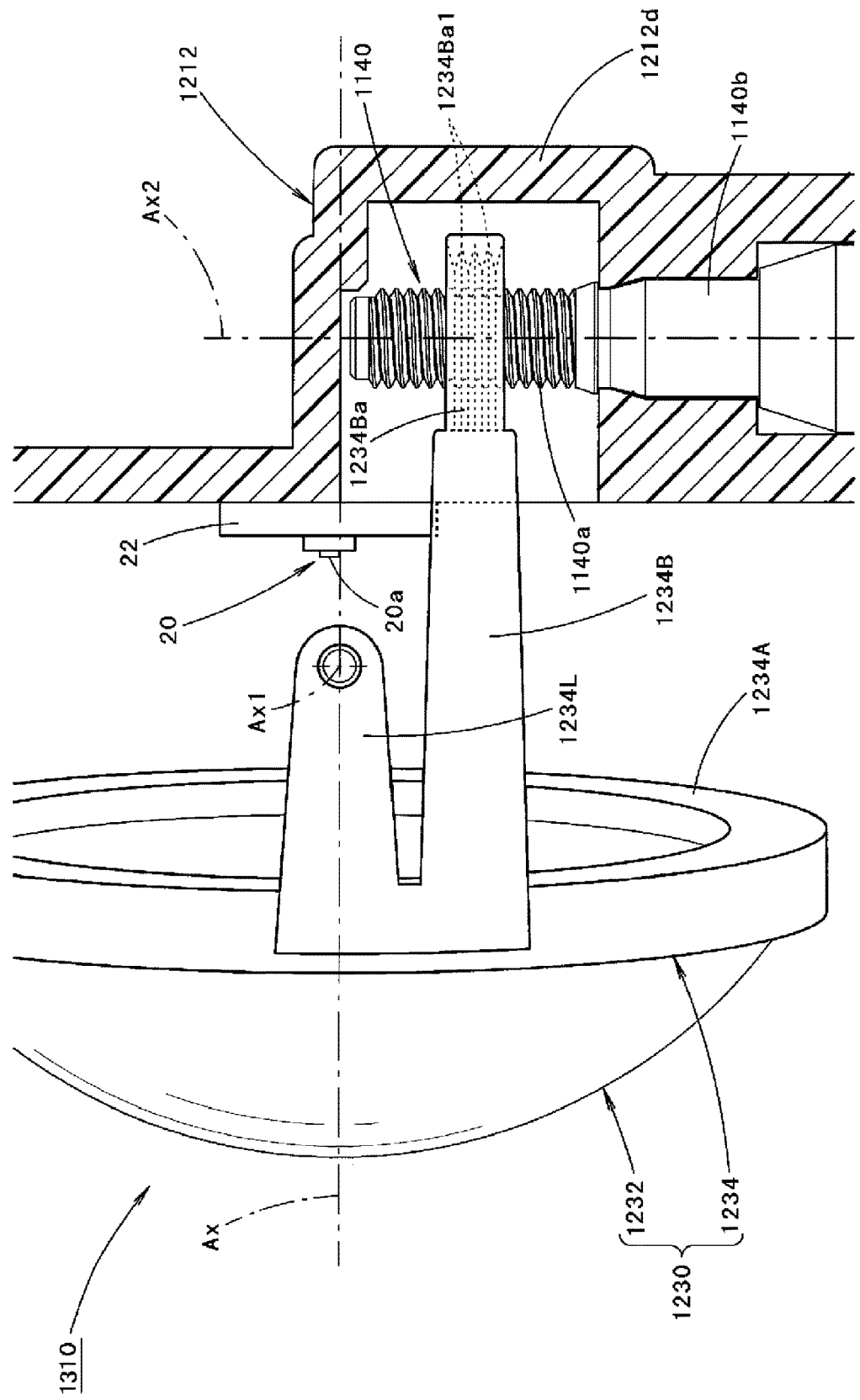
FIG. 20 is a view similar to FIG. 14, showing a partial enlarged view of a second modification of the second embodiment.

FIG. 20 is a view similar to FIG. 14, showing a partial enlarged view of a vehicle lamp 1310 according to the present modification.

As shown in FIG. 20, the basic configuration of the present modification is the same as that of the above embodiment shown in FIGS. 11 to 17, but the configuration of an optical member 1230 is partially different from that of the optical member 1130 of the above embodiment, and accordingly, the configuration of a lamp body 1212 is also partially different from that of the lamp body 1012 in the above embodiment.

That is, also in the optical member 1230 of the present modification, the configurations of a lens 1232 and a body part 1234A and a leg part 1234L of a lens holder 1234 are the same as those of the optical member 1130 in the above embodiment, but the configuration of a protruding piece 1234B is different from that of the protruding piece 1134B in the above embodiment.

Specifically, the protruding piece 1234B of the present modification is formed to extend toward the rear of the vehicle lamp 1310 below the leg part 1234L.

The protruding piece 1234B is formed to extend in a plate shape on the same vertical plane as the leg part 1234L, and its rear end edge is located on the rear side of the vehicle lamp 1310 than the optical axis adjustment screw 1140.

A portion of the protruding piece 1234B from the body part 1234A of the lens holder 1234 to a position on the rear side of the lamp with respect to the pivotal axis Ax1 is formed to be tapered toward the rear of the lamp in a side view, and a rear region 1234Ba located on the rear side of the lamp than the portion is formed to have a narrower vertical width which is substantially constant.

The outer surface of the protruding piece 1234B is formed in a single plane shape. However, a plurality of (specifically, three) groove portions 1234Ba1 for screwing with the optical axis adjustment screw 1140 is formed on the inner surface of the protruding piece 1234B.

In the present modification, the protruding piece 1234B is disposed below the leg part 1234L, and accordingly, the arrangements of an overhang portion 1212*d* of the lamp body 1212 and the optical axis adjustment screw 1140 are displaced downward as compared to the case of the above embodiment shown in FIGS. 11 to 17.

Also when the configuration of the present modification is adopted, the same operational effects as those of the above embodiment shown in FIGS. 11 to 17 can be obtained.

Further, when the configuration of the present modification is adopted, the lens holder 1234 can be easily molded.

Third Modification of Second Embodiment

Next, a third modification of the second embodiment will be described.

Figure 21:
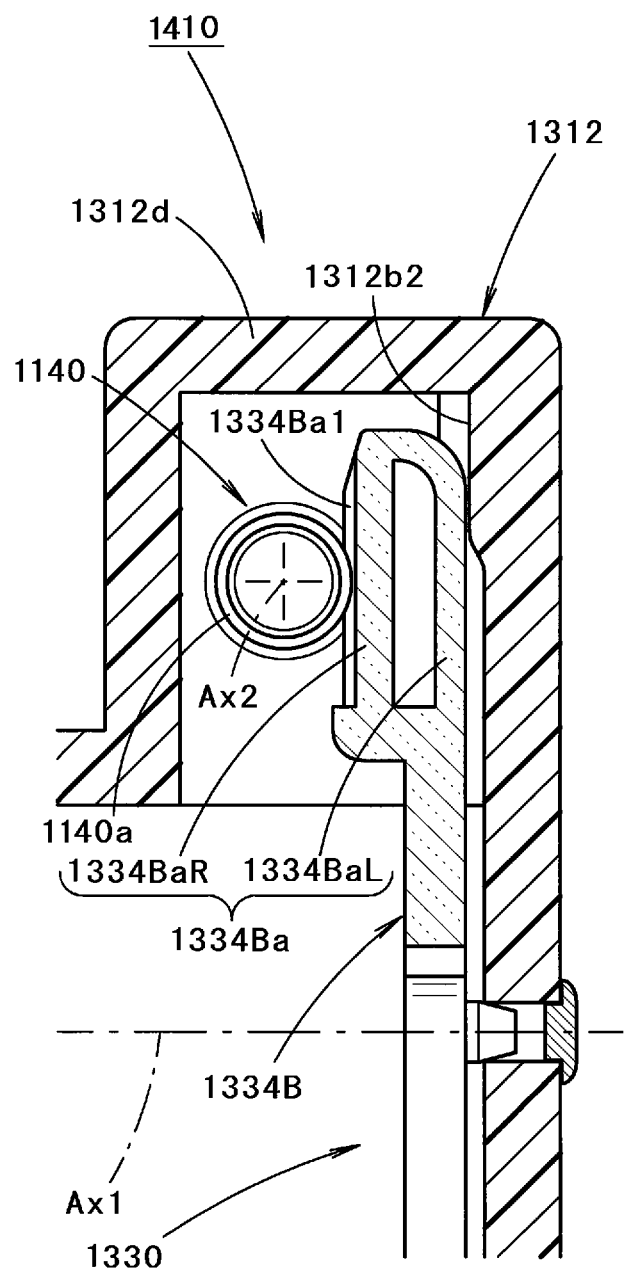
FIG. 21 is a view similar to FIG. 13, showing a partial enlarged view of a third modification of the second embodiment.

FIG. 21 is a view similar to FIG. 13, showing a partial enlarged view of a vehicle lamp 1410 according to the present modification.

As shown in FIG. 21, the basic configuration of the present modification is the same as that of the above embodiment shown in FIGS. 11 to 17, but the configuration of an optical member 1330 is partially different from that of the optical member 1130 of the above embodiment, and accordingly, the configuration of a lamp body 1312 is also partially different from that of the lamp body 1012 in the above embodiment.

Specifically, in the optical member 1330 of the present modification, a rear region 1334Ba of a protruding piece 1334B is formed to have a lateral width larger than the other general portions (the portions of the protruding piece 1334B where the rear region 1334Ba is not formed). Further, the rear region 1334Ba is configured to be elastically deformed by a pressing force from a detachment preventing portion 1312*b*2 of the lamp body 1312.

Specifically, in the protruding piece 1334B of the present modification, the rear region 1334Ba has a cylindrical structure long in the front and rear direction of the lamp in a plan view. A plurality of groove portions 1334Ba1 for screwing with the optical axis adjustment screw 1140 is formed on the inner surface of a right wall portion 1334BaR (that is, the side surface close to the axis Ax2) of the rear region 1334Ba.

A left wall portion 1334BaL of the rear region 1334Ba is formed thinner than the right wall portion 1334BaR, and its rear end portion is formed to be curved toward the right wall portion 1334BaR. The rear region 1334Ba is formed such that the outer surface of the left wall portion 1334BaL is flush with the outer surface of the other general portion (the portion of the protruding piece 1334B other than the rear region 1334Ba) other than the rear region 1334Ba.

The basic configuration of the lamp body 1312 of the present modification is the same as that of the above embodiment, but the lateral width of the rear region 1334Ba of the protruding piece 1334B increases, and accordingly, the lateral width of an overhang portion 1312*d* is larger than that in the above embodiment.

Further, in the present modification, the detachment preventing portion 1312*b*2 of the lamp body 1312 is in contact with the outer surface of the left wall portion 1334BaL in the rear region 1334Ba of the protruding piece 1334B in a state where the groove portions 1334Ba1 of the protruding piece 1334B and the threaded portion 1140*a* of the optical axis adjustment screw 1140 are screwed together.

In the optical member 1330 of the present modification, the rear end portion of the left wall portion 1334BaL is elastically deformed to maintain the contact state with the detachment preventing portion 1312*b*2 when the rear region 1334Ba of the protruding piece 1334B is subjected to a pressing force in a right direction (a direction toward the axis Ax2) from the detachment preventing portion 1312*b*2 of the lamp body 1312.

When the configuration of the present modification is adopted, it is possible to prevent in advance that an excessive load occurs at the time of operating the optical axis adjustment screw 1140 even when the detachment preventing portion 1312b2 is formed in a positional relationship in contact with the outer surface of the rear region 1334Ba of the protruding piece 1334B. In this way, the operability of the optical axis adjustment screw 1140 can be secured, and the screwed state between the groove portions 1334Ba1 of the protruding piece 1334B and the threaded portion 1140a of the optical axis adjustment screw 1140 can be reliably maintained.

Further, in the present modification, the rear end portion of the left wall portion 1334BaL can be elastically deformed to maintain the contact state with the detachment preventing portion 1312b2 even when the rear region 1334Ba of the protruding piece 1334B interferes with the detachment preventing portion 1312b2 of the lamp body 1312 due to an assembly error between the optical member 1330 and the lamp body 1312, or the like.

Meanwhile, the specific shape of the rear region 1334Ba of the protruding piece 1334B is not particularly limited as long as it can be elastically deformed by a pressing force from the detachment preventing portion 1312b2 of the housing.

Fourth Modification of Second Embodiment

Next, a fourth modification of the second embodiment will be described.

Figure 22:
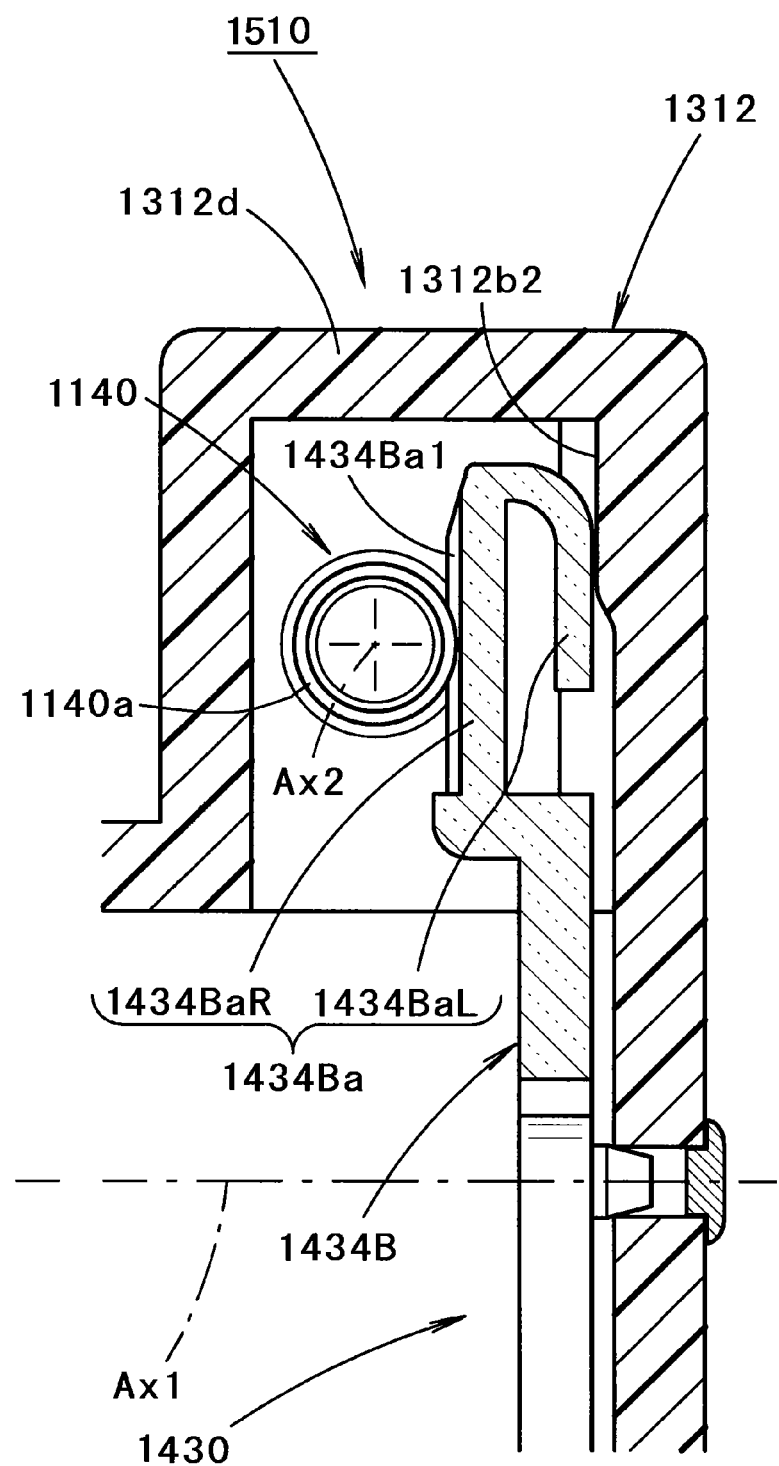
FIG. 22 is a view similar to FIG. 13, showing a partial enlarged view of a fourth modification of the second embodiment.

FIG. 22 is a view similar to FIG. 21, showing a partial enlarged view of a vehicle lamp 1510 according to the present modification.

As shown in FIG. 22, the basic configuration of the present modification is the same as that of the third modification of the second embodiment, but the configuration of an optical member 1430 is partially different from that of the third modification of the second embodiment.

Specifically, a rear region 1434Ba of a protruding piece 1434B in the optical member 1430 of the present modification has a configuration in which a part of a cylindrical structure long in the front and rear direction of the lamp is missed in a plan view. The rear region 1434Ba has a configuration in which a plurality of groove portions 1434Ba1 is formed on the inner surface of a right wall portion 1434BaR of the rear region 1434Ba so as to be screwed with the threaded portion 1140a of the optical axis adjustment screw 1140.

A left wall portion 1434BaL of the rear region 1434Ba is formed thinner than the right wall portion 1434BaR. Further, the left wall portion 1434BaL is configured such that its rear end portion is curved toward the right wall portion 1434BaR and its front region is cut away.

Also in the optical member 1430 of the present modification, the rear region 1434Ba of the protruding piece 1434B can be elastically deformed by a pressing force from the detachment preventing portion 1312b2 of the lamp body 1312.

Also in the optical member 1430 of the present modification, the rear end portion of the left wall portion 1434BaL is elastically deformed to maintain the contact state with the detachment preventing portion 1312b2 when the rear region 1434Ba of the protruding piece 1434B is subjected to a pressing force in a right direction from the detachment preventing portion 1312b2 of the lamp body 1312.

Therefore, also when the configuration of the present modification is adopted, the same operational effects as those of the third modification of the second embodiment can be obtained.

Fifth Modification of Second Embodiment

Next, a fifth modification of the second embodiment will be described.

Figure 23:
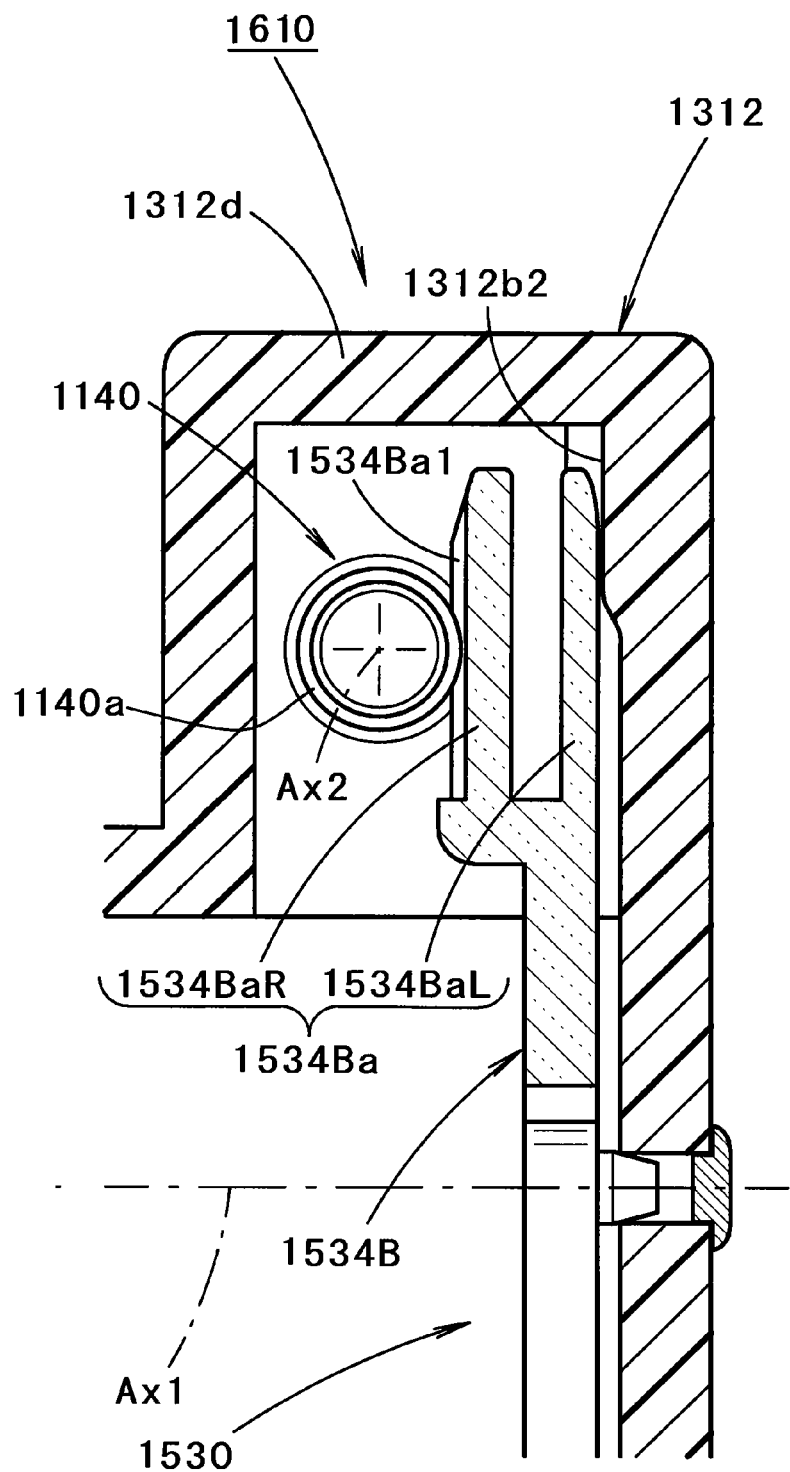
FIG. 23 is a view similar to FIG. 13, showing a partial enlarged view of a fifth modification of the second embodiment.

FIG. 23 is a view similar to FIG. 21, showing a main part of a vehicle lamp 1610 according to the present modification.

As shown in FIG. 23, the basic configuration of the present modification is the same as that of the third modification of the second embodiment, but the configuration of an optical member 1530 is partially different from that of the third modification of the second embodiment.

Specifically, a rear region 1534Ba of a protruding piece 1534B in the optical member 1530 of the present modification has a configuration in which a part of a cylindrical structure long in the front and rear direction of the lamp is missed in a plan view. The rear region 1534Ba has a configuration in which a plurality of groove portions 1534Ba1 is formed on the inner surface of a right wall portion 1534BaR of the rear region 1534Ba so as to be screwed with the threaded portion 1140a of the optical axis adjustment screw 1140.

In the rear region 1534Ba, a left wall portion 1534BaL is formed thinner than the right wall portion 1534BaR. The left wall portion 1534BaL and the right wall portion 1534BaR are separated at a rear end portion of the rear region 1564Ba. A rear end portion of the left wall portion 1534BaL has a surface shape whose outer surface is curved toward the rear of the lamp.

Also in the optical member 1530 of the present modification, the rear end portion of the left wall portion 1534BaL is elastically deformed to maintain the contact state with the detachment preventing portion 1312b2 when the rear region 1534Ba of the protruding piece 1534B is subjected to a pressing force in a right direction from the detachment preventing portion 1312b2 of the lamp body 1312.

Therefore, also when the configuration of the present modification is adopted, the same operational effects as those of the third modification of the second embodiment can be obtained.

Sixth Modification of Second Embodiment

Next, a sixth modification of the second embodiment will be described.

Figure 24:
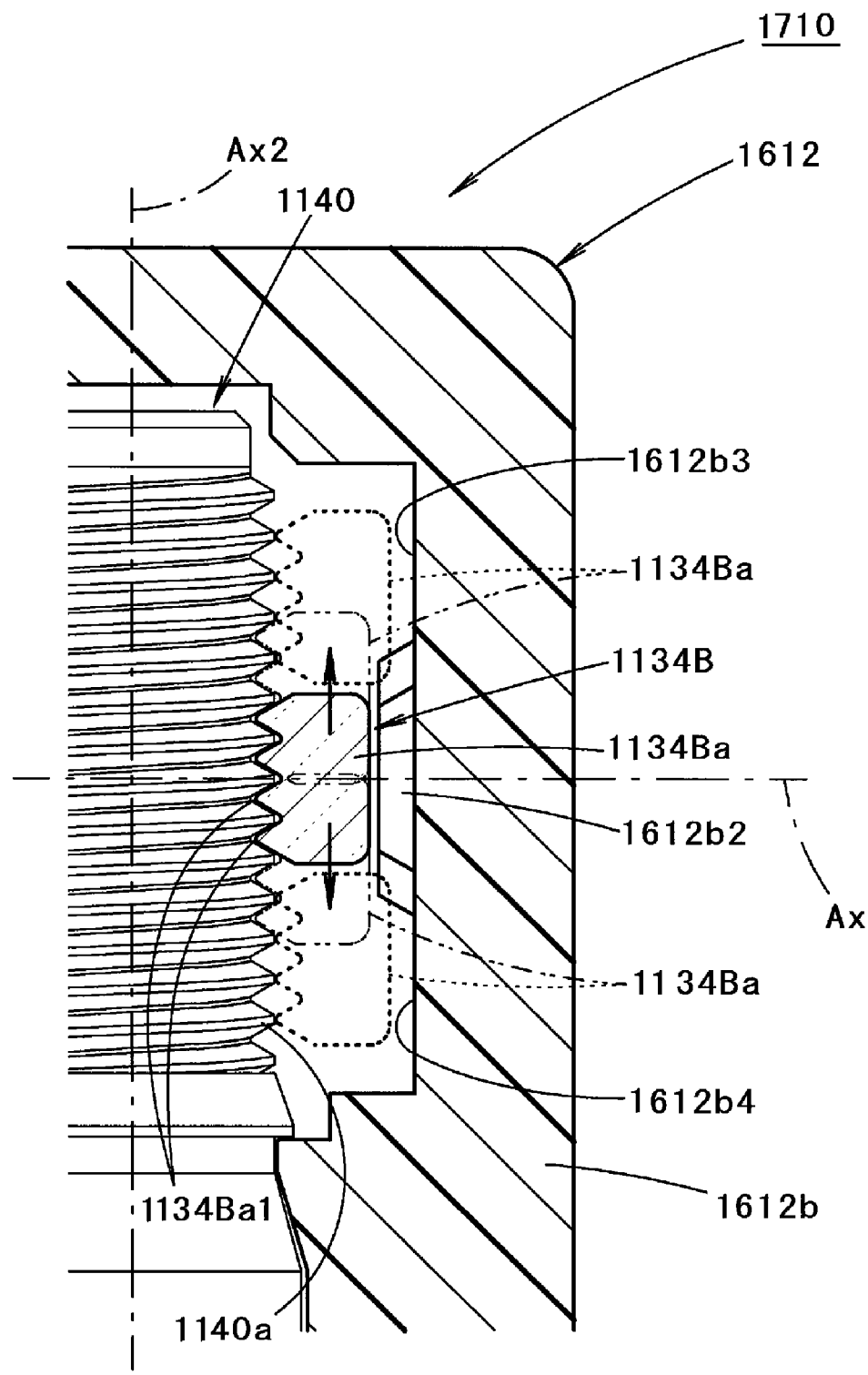
FIG. 24 is a view similar to FIG. 16, showing a partial enlarged view of a sixth modification of the second embodiment.

FIG. 24 is a view substantially similar to FIG. 16, showing a partial enlarged view of a vehicle lamp 1710 according to the present modification.

As shown in FIG. 24, the basic configuration of the present modification is the same as that of the above embodiment, but a shape of a detachment preventing portion 1612b2 formed on the inner surface of a left wall 1612b of a lamp body 1612 is partially different from that of the detachment preventing portion 1012b2 in the above embodiment.

Specifically, similar to the detachment preventing portion 1012b2 of the above embodiment, the detachment preventing portion 1612b2 of the present modification is formed to extend in an isosceles trapezoidal shape toward the front of the lamp. However, the detachment preventing portion 1612b2 is different from the detachment preventing portion 1012b2 of the above embodiment in that its outer peripheral edge is not formed in a smooth curved surface shape, unlike the outer peripheral edge of the detachment preventing portion 1012*b*2 in the above embodiment.

Specifically, the outer peripheral surface of the detachment preventing portion 1612*b*2 is composed of the same inclined surface as that of the detachment preventing portion 1012*b*2 of the above embodiment. However, the corner R is not given to a ridge line portion between the outer peripheral surface and the inner surface of the detachment preventing portion 1612*b*2, and the outer peripheral surface is formed at a so-called pin angle (i.e., an angular shape).

Meanwhile, the configuration of a pair of upper and lower detachment permitting portions 1612*b*3, 1612*b*4 formed on the inner surface of the left wall 1612*b* of the lamp body 1612 is the same as that of the detachment permitting portion 1012*b*3, 1012*b*4 in the above embodiment.

Also when the configuration of the present modification is adopted, the corner R is given to the ridge line portion of the protruding piece 1134B, so that the groove portions 1134B*a*1 of the protruding piece 1134B can be smoothly detached from or returned to the screwed state with the threaded portion 1140*a* of the optical axis adjustment screw 1140.

Seventh Modification of Second Embodiment

Next, a seventh modification of the second embodiment will be described.

Figure 25:
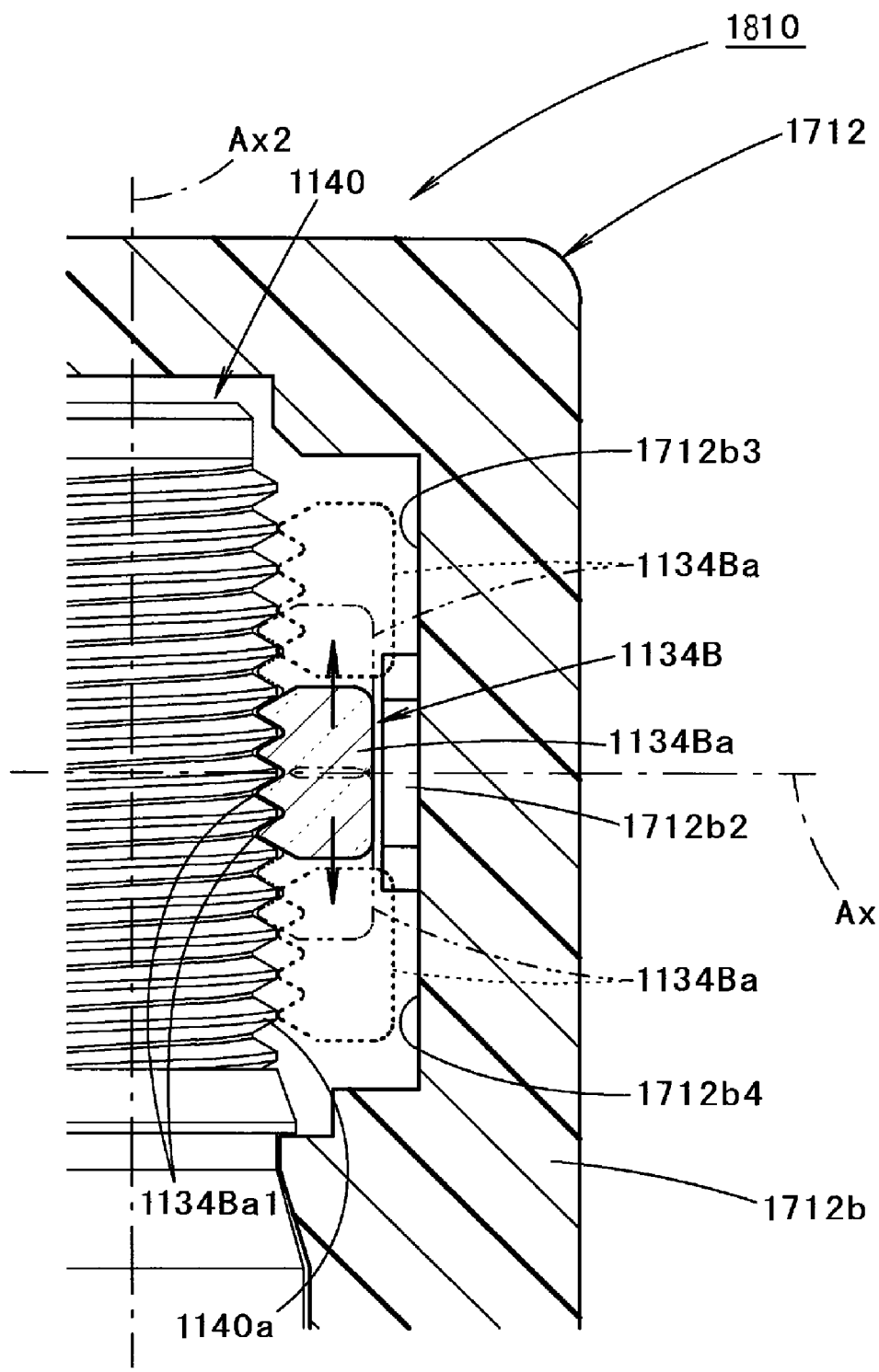
FIG. 25 is a view similar to FIG. 16, showing a partial enlarged view of a seventh modification of the second embodiment.

FIG. 25 is a view substantially similar to FIG. 16, showing a partial enlarged view of a vehicle lamp 1810 according to the present modification.

As shown in FIG. 25, the basic configuration of the present modification is the same as that of the above embodiment, but a shape of a detachment preventing portion 1712*b*2 formed on the inner surface of a left wall 1712*b* of a lamp body 1712 is partially different from that of the detachment preventing portion 1012*b*2 in the above embodiment.

Specifically, similar to the detachment preventing portion 1012*b*2 of the above embodiment, the detachment preventing portion 1712*b*2 of the present modification is formed to extend in an isosceles trapezoidal shape toward the front of the lamp. However, the shape of the outer peripheral edge of the detachment preventing portion 1712*b*2 is different from that of the detachment preventing portion 1012*b*2 in the above embodiment.

Specifically, the outer peripheral surface of the detachment preventing portion 1712*b*2 is composed of a vertical surface vertically rising from the inner surface of the left wall 1712*b* of the lamp body 1712, and a ridge line portion between the outer peripheral surface and the inner surface of the detachment preventing portion 1712*b*2 is formed at a pin angle.

Meanwhile, the configuration of a pair of upper and lower detachment permitting portions 1712*b*3, 1712*b*4 formed on the inner surface of the left wall 1712*b* of the lamp body 1712 is the same as that of the detachment permitting portion 1012*b*3, 1012*b*4 in the above embodiment.

Also when the configuration of the present modification is adopted, the corner R is given to the ridge line portion of the protruding piece 1134B, so that the groove portions 1134B*a*1 of the protruding piece 1134B can be smoothly detached from or returned to the screwed state with the threaded portion 1140*a* of the optical axis adjustment screw 1140.

Meanwhile, the numerical values described as specifications in the first embodiment, the second embodiment and the modifications of each embodiment are merely examples. Of course, these numerical values can be set to different values as appropriate.

Further, the disclosure is not limited to the configurations described in the above-described embodiments and the modifications thereof, but configurations in which various modifications other than these configurations are added may be adopted.

The type of the vehicle lamp is not particularly limited. For example, a fog lamp or a headlamp or the like can be adopted.

The type of the light source is not particularly limited. For example, a light emitting element such as a light emitting diode or a laser diode, or a light source bulb or the like can be adopted.

The specific configuration of the optical member is not particularly limited as long as it is a member capable of controlling the distribution of light from the light source. For example, a lens, a reflector, a shade or the like can be adopted. Further, in the optical member, the body portion having a light distribution control function and the protruding piece may be integrally formed, or both may be separately formed.

The specific direction of the first direction is not particularly limited as long as it intersects the front and rear direction of the lamp. For example, the vehicle width direction or the vertical direction of the vehicle lamp or the like can be adopted.

The specific direction of the second direction is not particularly limited as long as it intersects the first direction and the front and rear direction of the lamp.

The specific arrangement and shape of the protruding piece are not particularly limited as long as it is formed to extend toward the rear of the lamp from the optical member.

This application is based on Japanese Patent Application (JP-A-2017-44400) filed on Mar. 8, 2017, Japanese Patent Application (JP-A-2017-60758) filed on Mar. 27, 2017, and Japanese Patent Application (JP-A-2017-116282) filed on Jun. 13, 2017, the contents of which are incorporated herein by reference.

The invention claimed is:

1. A vehicle lamp configured such that the distribution of light from a light source is controlled by an optical member, the vehicle lamp comprising
a housing configured to support the optical member pivotably around a pivotal axis extending in a first direction intersecting a front and rear direction of the lamp; and
an optical axis adjustment screw configured to pivot the optical member around the pivotal axis with respect to the housing,
wherein the optical axis adjustment screw is supported by the housing in a state of being arranged to extend in a second direction intersecting the first direction and the front and rear direction of the lamp on the rear side of the lamp with respect to the pivotal axis,
wherein a protruding piece extending toward the rear of the lamp is formed on the optical member,
wherein a groove portion to be screwed with the optical axis adjustment screw is formed on a rear end surface of the protruding piece, and
wherein an excessive-rotation restricting portion is formed in the optical axis adjustment screw so as to come into contact with a rear end portion of the protruding piece to restrict further rotation of the optical member when the optical member is pivoted by a predetermined angle or more from a pivot reference position.

2. The vehicle lamp according to claim 1,
wherein the optical axis adjustment screw has a threaded portion to be screwed with the groove portion of the protruding piece, the threaded portion being configured by an hourglass worm.

3. The vehicle lamp according to claim 2,
wherein the first direction is set to a horizontal direction, and the second direction is set to a vertical direction, and
wherein the threaded portion of the optical axis adjustment screw is configured by a substantially upper half of the hourglass worm.

4. The vehicle lamp according to claim 1,
wherein the groove portion of the protruding piece is formed to extend along an arc centered on an axis extending in the second direction.

5. The vehicle lamp according to claim 1,
wherein a detachment preventing portion is formed in the housing in a positional relationship in close proximity to or in contact with the optical axis adjustment screw so as to prevent that the groove portion of the protruding piece is disengaged from the screwed state with the optical axis adjustment screw due to the bending deformation of the optical axis adjustment screw.

6. A vehicle lamp configured such that the distribution of light from a light source is controlled by an optical member, the vehicle lamp comprising
a housing configured to support the optical member pivotably around a pivotal axis extending in a first direction intersecting a front and rear direction of the lamp; and
an optical axis adjustment screw configured to pivot the optical member around the pivotal axis with respect to the housing,
wherein the optical axis adjustment screw is supported by the housing in a state of being arranged to extend in a second direction intersecting the first direction and the front and rear direction of the lamp,
wherein a protruding piece extending toward the rear of the lamp is formed at an end portion of the optical member in the first direction,
wherein a groove portion to be screwed with the optical axis adjustment screw is formed on an inner surface of a rear region of the protruding piece located on the rear side of the lamp with respect to the pivotal axis,
wherein a detachment preventing portion is formed in the housing in a positional relationship in close proximity to or in contact with an outer surface of the rear region of the protruding piece so as to prevent the groove portion of the protruding piece from being disengaged from the screwed state with the optical axis adjustment screw,
wherein a leg part extending toward the rear of the lamp is formed at an end portion of the optical member in the first direction, and
wherein a fulcrum protrusion is formed at a position on the pivotal axis on an outer surface of the leg part so as to support the optical member pivotably around the pivotal axis by the engagement with the housing.

7. The vehicle lamp according to claim 6,
wherein the leg part is formed in a tongue shape toward the rear of the lamp, and
wherein the protruding piece is formed to surround the leg part at substantially the same position as the leg part in the first direction.

8. The vehicle lamp according to claim 6,
wherein a detachment permitting portion is formed in the housing so as to allow the groove portion of the protruding piece to be disengaged from the screwed state with the optical axis adjustment screw when the optical member is pivoted by a predetermined angle or more from a pivot reference position.

9. The vehicle lamp according to claim 6,
wherein a rear region of the protruding piece is configured to be elastically deformed by a pressing force from the detachment preventing portion of the housing.

* * * * *